(12) United States Patent
Lix et al.

(10) Patent No.: US 10,369,719 B1
(45) Date of Patent: Aug. 6, 2019

(54) APPARATUS FOR CUTTING WORKPIECES

(71) Applicant: Cleveland Whiskey LLC, Cleveland, OH (US)

(72) Inventors: Thomas Steven Lix, Cleveland, OH (US); Michael Adam Pintz, Cleveland, OH (US); Andrew Lawrence Somrack, Cleveland, OH (US); Ethan Hiram Snyder, Cleveland, OH (US)

(73) Assignee: CLEVELAND WHISKEY LLC, Cleveland, OH (US)

( * ) Notice: Subject to any disclaimer, the term of this patent is extended or adjusted under 35 U.S.C. 154(b) by 19 days.

(21) Appl. No.: 15/925,188

(22) Filed: Mar. 19, 2018

(51) Int. Cl.
| | | |
|---|---|---|
| *B27B 29/10* | (2006.01) |
| *B27B 29/02* | (2006.01) |
| *B27B 15/08* | (2006.01) |
| *B27B 13/04* | (2006.01) |
| *B27B 27/04* | (2006.01) |
| *B65D 8/00* | (2006.01) |
| *C12H 1/22* | (2006.01) |
| *C12G 3/07* | (2006.01) |

(52) U.S. Cl.
CPC .............. *B27B 29/10* (2013.01); *B27B 13/04* (2013.01); *B27B 15/08* (2013.01); *B27B 27/04* (2013.01); *B27B 29/02* (2013.01); *B65D 9/04* (2013.01); *C12G 3/07* (2019.02); *C12H 1/22* (2013.01)

(58) Field of Classification Search
CPC ......... B27B 27/04; B27B 29/10; B27B 29/02; B27B 31/00–08

USPC ..................... 83/720, 723, 724, 86
See application file for complete search history.

(56) References Cited

U.S. PATENT DOCUMENTS

| | | | | |
|---|---|---|---|---|
| 2,550,360 A | * | 4/1951 | Lewis .................... | B27B 29/10 |
| | | | | 83/725 |
| 3,854,614 A | * | 12/1974 | Albrecht .................. | B23Q 7/05 |
| | | | | 226/177 |
| 3,906,829 A | * | 9/1975 | Westfall .................. | B27B 29/10 |
| | | | | 83/435.27 |
| 4,283,977 A | * | 8/1981 | Batson .................... | B23D 47/04 |
| | | | | 269/203 |
| 4,294,149 A | * | 10/1981 | Olsson .................... | B27B 1/007 |
| | | | | 144/242.1 |
| 4,383,561 A | * | 5/1983 | Gregoire ................. | B27B 31/06 |
| | | | | 144/245.2 |

(Continued)

*Primary Examiner* — Sean M Michalski
(74) *Attorney, Agent, or Firm* — Pearne & Gordon LLP

(57) ABSTRACT

An apparatus is provided for cutting a plurality of workpieces that is arranged relative to first, second, and third reference axes that are perpendicular to each other. The apparatus includes a cutting assembly and an input assembly. The cutting assembly includes a chassis, and first and second saw blades movably coupled to the chassis that are configured to respectively cut along first and second cutting planes that are transverse to each other. The input assembly includes a tabletop and first and second clamping mechanisms for clamping the workpieces collectively. The first clamping mechanism includes a first counterpart and a first movable member that is translatable along the first reference axis and translatable relative to the first counterpart. The second clamping mechanism includes a second counterpart and a plurality of second movable members that are each translatable along the second reference axis relative to the second counterpart.

20 Claims, 13 Drawing Sheets

(56) References Cited

U.S. PATENT DOCUMENTS

| | | | | |
|---|---|---|---|---|
| 4,829,865 A * | 5/1989 | Nunnery | ............... | B27B 5/228 |
| | | | | 144/195.1 |
| 5,088,364 A * | 2/1992 | Stolzer | ............... | B23D 47/042 |
| | | | | 83/153 |
| 5,109,899 A * | 5/1992 | Henderickson | ...... | B23D 45/027 |
| | | | | 144/378 |
| 5,544,558 A * | 8/1996 | Hughes | ............... | B23D 59/001 |
| | | | | 144/357 |
| 5,641,266 A * | 6/1997 | Lehtimaki | ............... | B27B 31/00 |
| | | | | 414/796 |
| 5,784,941 A * | 7/1998 | Sanborn | ............... | B27B 17/005 |
| | | | | 83/471.2 |
| 6,055,895 A * | 5/2000 | Kanazawa | ............. | B21D 43/18 |
| | | | | 414/752.1 |
| 6,196,283 B1 * | 3/2001 | Hundegger | .......... | B23D 47/045 |
| | | | | 144/242.1 |
| 6,305,446 B1 * | 10/2001 | Showan | ............... | B23Q 39/026 |
| | | | | 144/135.2 |
| 6,460,440 B1 * | 10/2002 | Tsune | ............... | B23D 47/06 |
| | | | | 83/153 |
| 6,708,593 B1 * | 3/2004 | Weselyk | ............... | B23D 53/06 |
| | | | | 144/286.1 |
| 8,105,009 B1 * | 1/2012 | Harper | ............... | B27B 31/06 |
| | | | | 144/245.2 |
| 10,207,421 B1 * | 2/2019 | Weinschenk | ............. | B27B 5/36 |
| 2004/0188225 A1 * | 9/2004 | Southwick | ............ | B27B 31/006 |
| | | | | 198/580 |
| 2006/0179982 A1 * | 8/2006 | Fenton | ............... | B23D 45/024 |
| | | | | 83/13 |
| 2007/0039664 A1 * | 2/2007 | Quick | ............... | B27B 31/003 |
| | | | | 144/356 |
| 2008/0092708 A1 * | 4/2008 | Benuzzi | ............... | B23D 47/04 |
| | | | | 83/469 |
| 2008/0184856 A1 * | 8/2008 | Koskovich | ............ | B27B 5/207 |
| | | | | 83/56 |
| 2017/0361484 A1 * | 12/2017 | Pardini | ............... | B25H 1/08 |
| 2018/0056461 A1 * | 3/2018 | Smith | ............... | B27B 17/005 |

* cited by examiner

APPARATUS FOR CUTTING WORKPIECES

FIELD OF THE INVENTION

This application relates generally to an apparatus for cutting a plurality of workpieces, and more particularly, to apparatus for cutting a plurality of wooden boards collectively into a plurality of blocks.

BACKGROUND OF THE INVENTION

Whiskey is typically made by distilling a grain-based alcohol in a still and then aging the distilled alcohol in a wooden barrel, generally made of charred white oak. The wooden boards used to form the barrels become impregnated with the whiskey in the aging process, and can be repurposed after the aging process to produce briquets for smoking and/or flavoring food or other beverages. However, cutting the wooden boards into cube-shaped briquets can be difficult, since the wooden boards often have a curvature due to the shape of the wooden barrel. This curvature makes it difficult to stack and cut the boards collectively. Moreover, while the boards may be cut individually into smaller pieces, this process can be time consuming.

BRIEF SUMMARY OF THE INVENTION

In accordance with a first aspect, there is provided an apparatus for cutting a plurality of workpieces collectively into a plurality of blocks. The apparatus is arranged relative to a first reference axis, a second reference axis, and a third reference axis that are perpendicular to each other. The apparatus includes a cutting assembly configured to cut the plurality of workpieces collectively, and an input assembly configured to support and clamp the plurality of workpieces collectively while being cut by the cutting assembly. The cutting assembly includes a chassis, a first saw blade movably coupled to the chassis and configured to cut along a first cutting plane, and a second saw blade movably coupled to the chassis and configured to cut along a second cutting plane that is transverse to the first cutting plane. The input assembly includes a flat, fixed, and stable structure (e.g., a tabletop) for supporting the plurality of workpieces collectively, a first clamping mechanism for clamping the plurality of workpieces collectively, and a second clamping mechanism for clamping the plurality of workpieces collectively. The first clamping mechanism includes a first movable member movably coupled to the tabletop such that the first movable member is translatable along the first reference axis, and a first counterpart coupled to the tabletop such that the first movable member is translatable relative to the first counterpart in order to clamp the plurality of workpieces between the first counterpart and the first movable member. The second clamping mechanism includes a plurality of second movable members movably coupled to the tabletop such that each second movable member is translatable along the second reference axis, and a second counterpart coupled to the tabletop such that each second movable member is translatable relative to the second counterpart in order to clamp an associated workpiece between the second counterpart and the plurality of second movable members.

In some examples of the first aspect, the second reference axis is vertical and the first reference axis is substantially horizontal.

Further in some examples of the first aspect, the first cutting plane is substantially horizontal and the second cutting plane is substantially vertical.

Still further in some examples of the first aspect, the first movable member includes at least one elongated body, each elongated body having a longitudinal axis that is substantially perpendicular to the first reference axis. In some examples, the first movable member can include two elongated bodies that are fixed relative to each other via a linkage, and the first movable member can be rotatable about a first rotational axis that is substantially perpendicular to the first reference axis. Further in some examples, the first movable member can be rotatably coupled to an arm that is rotatable about a second rotational axis, the second rotational axis being substantially parallel to and spaced from the first rotational axis.

Still yet further in some examples of the first aspect, the first counterpart includes an elongated body that is fixed to the tabletop, the elongated body having a longitudinal axis that is substantially perpendicular to the first reference axis. In some examples, the first counterpart can include one or more bearings rotatably coupled to its elongated body such that each bearing is rotatable about the longitudinal axis of the elongated body. Further in some examples, the first clamping mechanism can include a plurality of first counterparts coupled to the tabletop such that the longitudinal axes of the plurality of first counterparts are coplanar.

Further in some examples of the first aspect, each second movable member is translatable along the third reference axis.

Still further in some examples of the first aspect, the second clamping mechanism includes an actuator assembly having a pin plate defining a plurality of pin holes, a plurality of retainment plates, and a plurality of linear actuators, each linear actuator including a main body fixed to an associated retainment plate and a rod fixed to the pin plate that is movable relative to the main body. Each second movable member is fixed to one of the retainment plates and extends through one of the pin holes.

Still yet further in some examples of the first aspect, the first saw blade is movably coupled to the chassis such that the first saw blade is translatable along the first reference axis, and the second saw blade is movably coupled to the chassis such that the second saw blade is translatable along the second reference axis.

Further in some examples of the first aspect, the apparatus further includes a first drive mechanism that is operable to translate the first movable member along the first reference axis between a first engaged state and a first released state, a second drive mechanism that is operable to translate the plurality of second movable members along the second reference axis between a second engaged state and a second released state, a third drive mechanism that is operable to translate the plurality of second movable members along the third reference axis between an advanced state and a retracted state, a fourth drive mechanism that is operable to impart a first cutting motion to the first saw blade, a fifth drive mechanism that is operable to impart a second cutting motion to the second saw blade, a sixth drive mechanism that is operable to translate the first saw blade along the first reference axis, and a seventh drive mechanism that is operable to translate the second saw blade along the second reference axis.

In some examples, the apparatus can further include a control system having a controller that is configured to perform a clamping operation, wherein during the clamping operation, the controller operates the first drive mechanism to translate the first movable member along the first reference axis from the first released state to the first engaged state, and the controller operates the second drive mechanism to translate the plurality of second movable members along the second reference axis from the second released state to the second engaged state. Further in some examples, the controller can be configured to perform a cutting operation, wherein during the cutting operation, the controller operates the fourth drive mechanism to impart the first cutting motion to the first saw blade, the controller operates the fifth drive mechanism to impart the second cutting motion to the second saw blade, the controller operates the sixth drive mechanism to translate the first saw blade along the first reference axis, and the controller operates the seventh drive mechanism to translate the second saw blade along the second reference axis. Still further in some examples, the controller can be configured to perform a releasing operation, wherein during the releasing operation, the controller operates the first drive mechanism to translate the first movable member along the first reference axis from the first engaged state to the first released state, and the controller operates the second drive mechanism to translate the plurality of second movable members along the second reference axis from the second engaged state to the second released state. Still yet further in some examples, the controller can be configured to perform an advancing operation, wherein during the advancing operation, the controller operates the third drive mechanism to translate the plurality of second movable members along the third reference axis from the advanced state to the retracted state, and then the controller operates the second drive mechanism to translate the plurality of second movable members along the second reference axis from the second released state to the second engaged state, and then the controller operates the third drive mechanism to translate the plurality of second movable members along the third reference axis from the retracted state to the advanced state.

Still yet further in some examples of the first aspect, each workpiece can correspond to a wooden board.

In accordance with a second aspect, there is provided an input assembly for supporting and clamping a plurality of workpieces collectively during a cutting operation, the input assembly being arranged relative to a first reference axis, a second reference axis, and a third reference axis that are perpendicular to each other. The input assembly includes a tabletop for supporting the plurality of workpieces collectively, a first clamping mechanism for clamping the plurality of workpieces collectively, and a second clamping mechanism for clamping the plurality of workpieces collectively. The first clamping mechanism includes a first movable member movably coupled to the tabletop such that the first movable member is translatable along the first reference axis, and a first counterpart coupled to the tabletop such that the first movable member is translatable relative to the first counterpart in order to clamp the plurality of workpieces between the first counterpart and the first movable member. The second clamping mechanism includes a plurality of second movable members movably coupled to the tabletop such that each second movable member is translatable along the second reference axis, and a second counterpart coupled to the tabletop such that each second movable member is translatable relative to the second counterpart in order to clamp an associated workpiece between the second counterpart and the plurality of second movable members.

In some examples of the second aspect, the first movable member includes two elongated bodies that are fixed relative to each other via a linkage, each elongated body having a longitudinal axis that is substantially perpendicular to the first reference axis, and the first movable member is rotatable about a first rotational axis that is substantially perpendicular to the first reference axis.

Further in some examples of the second aspect, the second clamping mechanism includes an actuator assembly including a pin plate defining a plurality of pin holes, a plurality of retainment plates, and a plurality of linear actuators, each linear actuator including a main body fixed to an associated retainment plate and a rod fixed to the pin plate that is movable relative to the main body. Each second movable member is fixed to one of the retainment plates and extends through one of the pin holes.

DESCRIPTION OF EXAMPLE EMBODIMENTS

Figure 1:
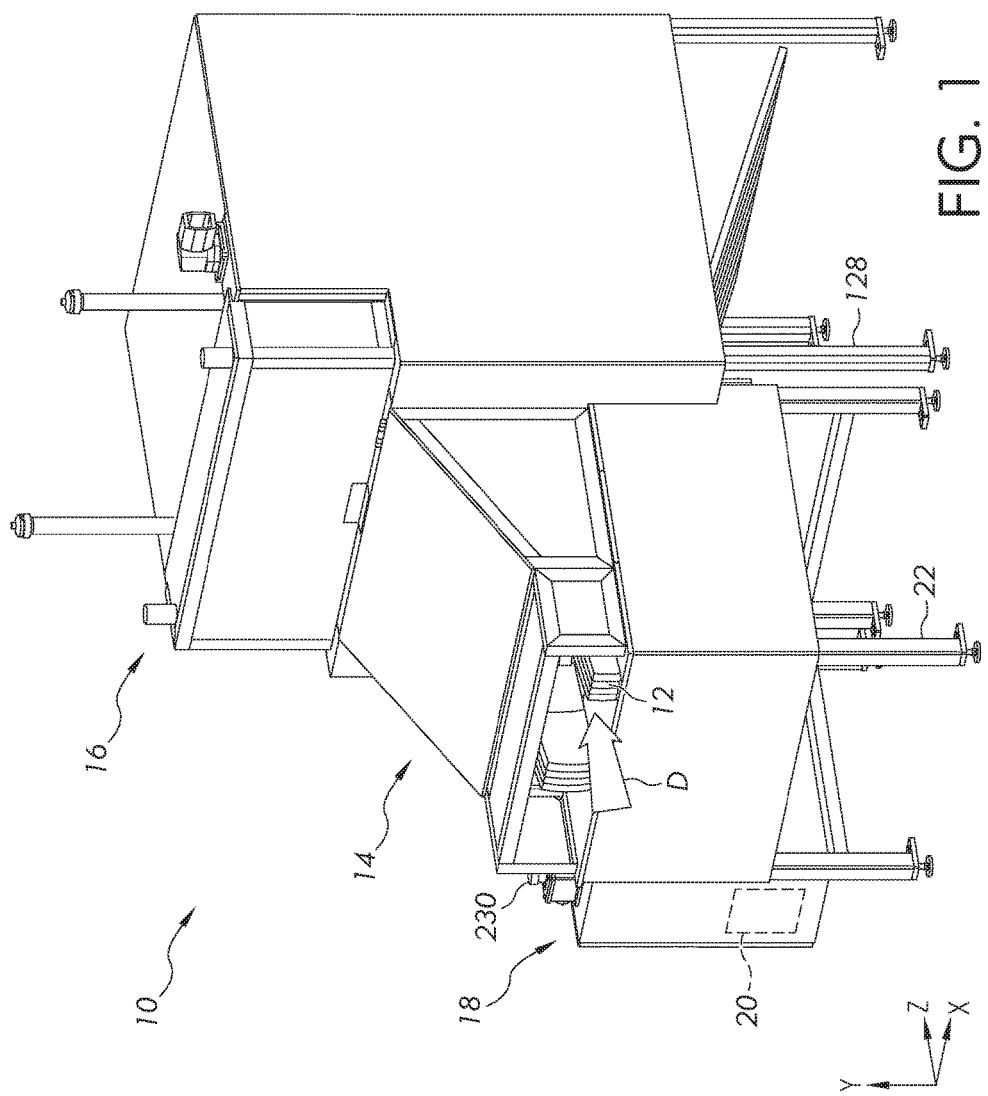
FIG. 1 is a perspective view of an example apparatus for cutting a plurality of boards collectively into a plurality of blocks.

Apparatus will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein.

Within the disclosure, certain features may be described with reference to a first reference axis X, a second reference axis Y, and/or a third reference axis Z. The reference axes X, Y, Z are imaginary axes that are all perpendicular to each other and intersect at a common point (see e.g., FIG. 1). In particular, the first reference axis X is vertical while the second and third reference axes Y, Z are horizontal. Thus, a feature's location in space can be defined by its location along the three reference axes X, Y, Z, respectively.

For the purposes of this disclosure, reference to a feature as being translatable along a reference axis means that the feature is movable in a manner such that the feature's location as referenced along the respective axis is variable. For example, the feature may be coincident with the reference axis and be movable in a direction parallel to the reference axis. In other examples, the feature may be spaced from the reference axis but nonetheless be movable in a direction parallel to the reference axis. Still in other examples, the feature may not move parallel to the reference axis but nonetheless be movable along the reference axis in a direction oblique to the reference axes. Indeed, in such examples, the feature will be considered to be movable along multiple reference axes (e.g., two or three reference axes). A feature described as being translatable relative to a reference axis simply means that the feature is movable in a manner such that the feature's location as referenced along the respective reference axis is variable. The feature need not move parallel to and coincident with the reference axis.

Also within the disclosure, certain features may be described as being "substantially parallel" or "substantially perpendicular" to each other. Moreover, some features may be described as being "substantially horizontal" or "substantially vertical" in orientation. For the purposes of this disclosure, reference to two or more features as being "substantially parallel" or "substantially perpendicular" to each other means that the features are within 15 degrees or less of parallel or perpendicular to each other, and more preferably, within 10 degrees or less of parallel or perpendicular to each other, and even more preferably, exactly parallel or perpendicular to each other. Moreover, reference to a feature as being "substantially horizontal" or "substantially vertical" means that the feature is within 15 degrees or less of horizontal or vertical, and more preferably, within 10 degrees or less of horizontal or vertical, and even more preferably, exactly horizontal or vertical.

Figure 2:
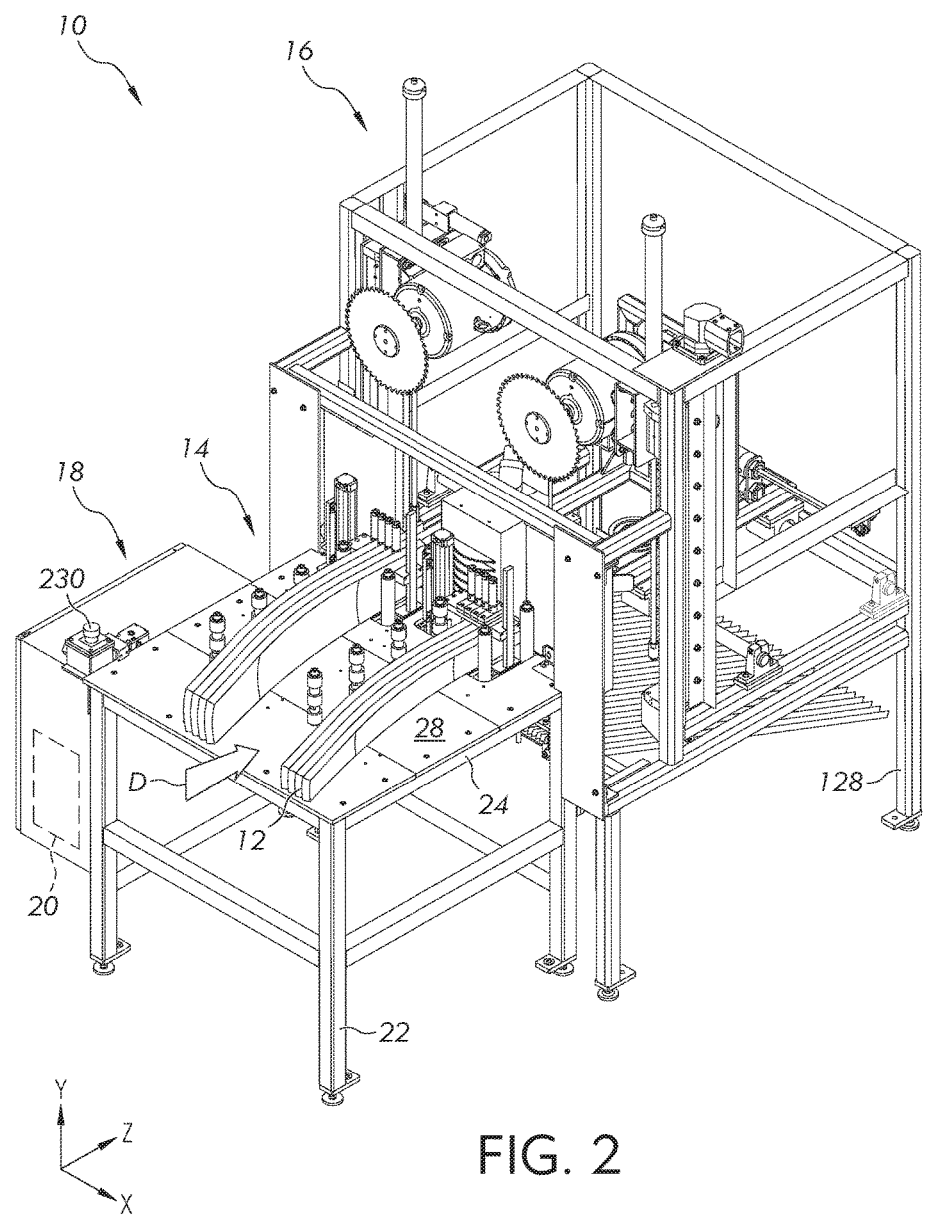
FIG. 2 is another perspective view of the apparatus, with various outer panels removed for the purpose of illustrating internal features.

Turning now to FIGS. 1 & 2, an apparatus 10 for cutting a plurality of workpieces 12 is arranged relative the first reference axis X, the second reference axis Y, and the third reference axis Z. FIG. 1 shows the apparatus 10 as a whole, while FIG. 2 shows the apparatus 10 with various outer panels removed for the purpose of illustrating internal features.

In the illustrated embodiment and description below, each workpiece 12 corresponds to a wooden board that previously belonged to a wooden barrel used to manufacture whiskey. In particular, each board 12 can comprise oak and can have a curved, elongated shape. However, each board 12 may comprise other shapes or materials in other examples, and may not necessarily be derived from a barrel used to manufacture whiskey. Moreover, in some examples, each workpiece 12 may comprise a stave or some other form of lumber (e.g., a small tree limb). It is to be appreciated that each workpiece 12 can comprise a variety of different structure that is intended to be cut by the apparatus 10.

As will be described in further detail below, the apparatus 10 comprises an input assembly 14, a cutting assembly 16, and a control system 18 having a programmable controller 20 (e.g., a central processing unit (CPU)) that can operate one or more drive mechanisms of the input assembly 14 and cutting assembly 16 to perform one or more operations. The apparatus 10 is designed such that the boards 12 can be loaded onto the input assembly 14 and fed toward the cutting assembly 16 in a feeding direction D that is substantially parallel to the first reference axis X.

Figure 3:
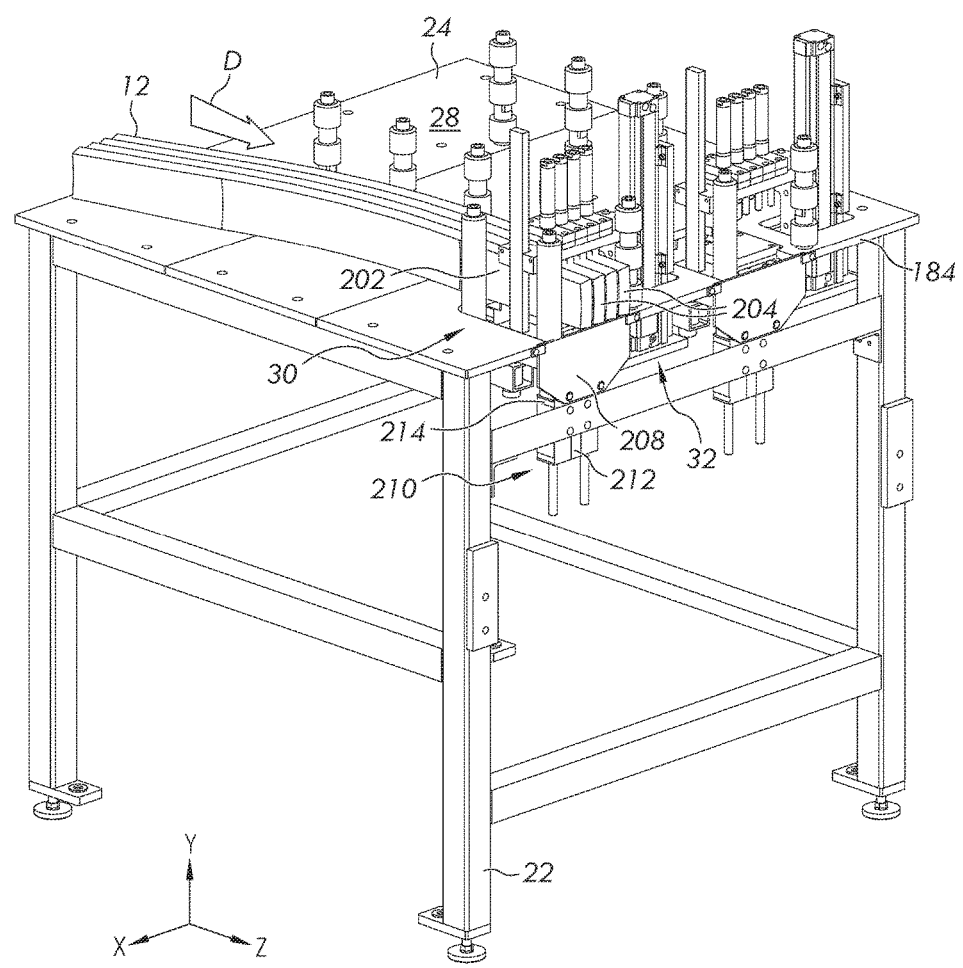
FIG. 3 is a perspective view of an input assembly of the apparatus, with various outer panels removed for the purpose of illustrating internal features.

Turning to FIGS. 3-7, the input assembly 14 will now be described in further detail. FIG. 3 is a perspective view of the input assembly 14, with various outer panels removed for the purpose of illustrating internal features. Meanwhile, FIGS. 4-7 illustrate various features of the input assembly 14 in close-up, in cross-section, and/or in isolation.

As shown in FIG. 3, the input assembly 14 includes a rigid support structure 22 and a tabletop 24 that is fixed to and supported by the rigid support structure 22. The tabletop 24 defines support surface 28 for supporting the plurality of boards 12 collectively. Preferably, the support surface 28 is substantially horizontal, although other orientations are possible in other examples.

The input assembly 14 further includes first and second clamping mechanisms 30, 32 for clamping the boards 12 collectively to the tabletop 24. In particular, each clamping mechanism 30, 32 is configured to clamp the boards 12 collectively along one or more of the reference axes X, Y, Z to inhibit movement of the boards 12 along the respective one or more reference axes.

Figure 4:
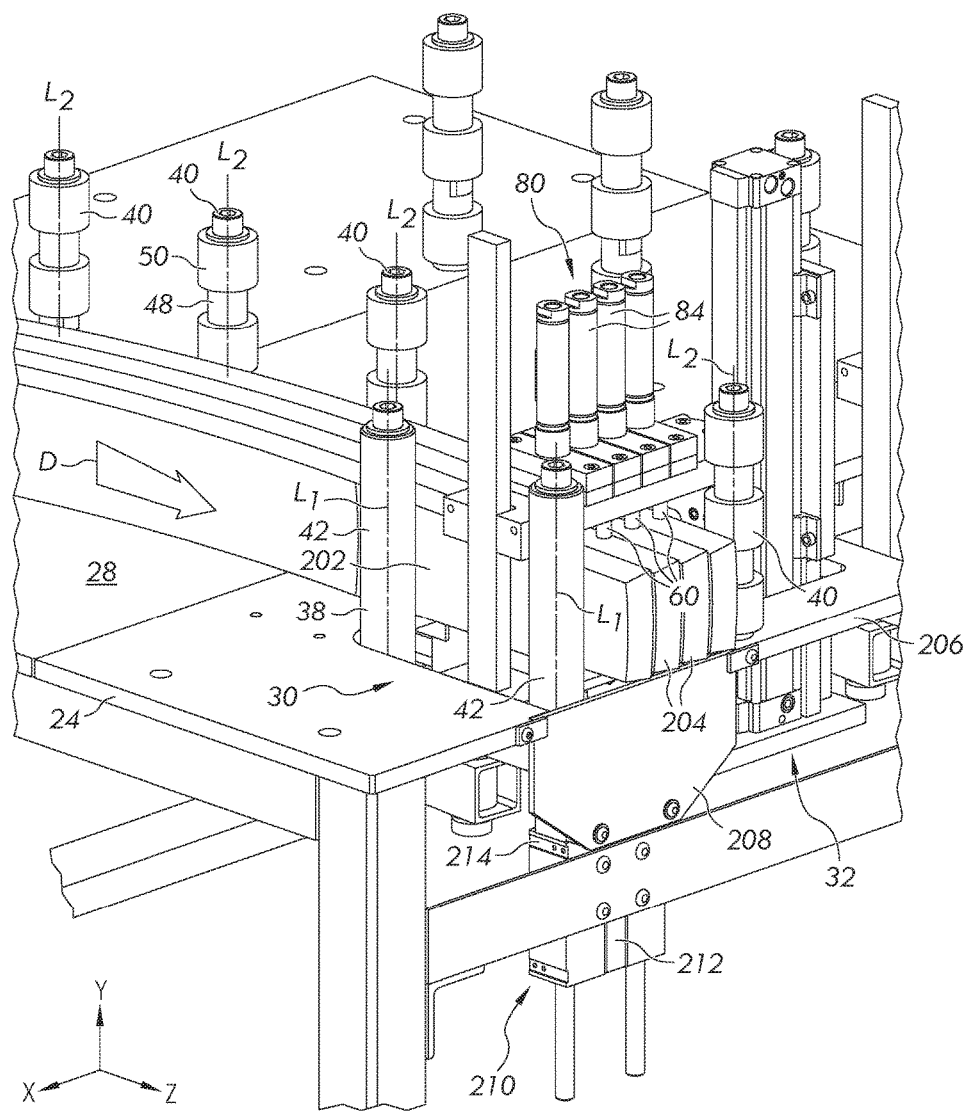
FIG. 4 is an enlarged perspective view of the input assembly in FIG. 3.
Figure 5:
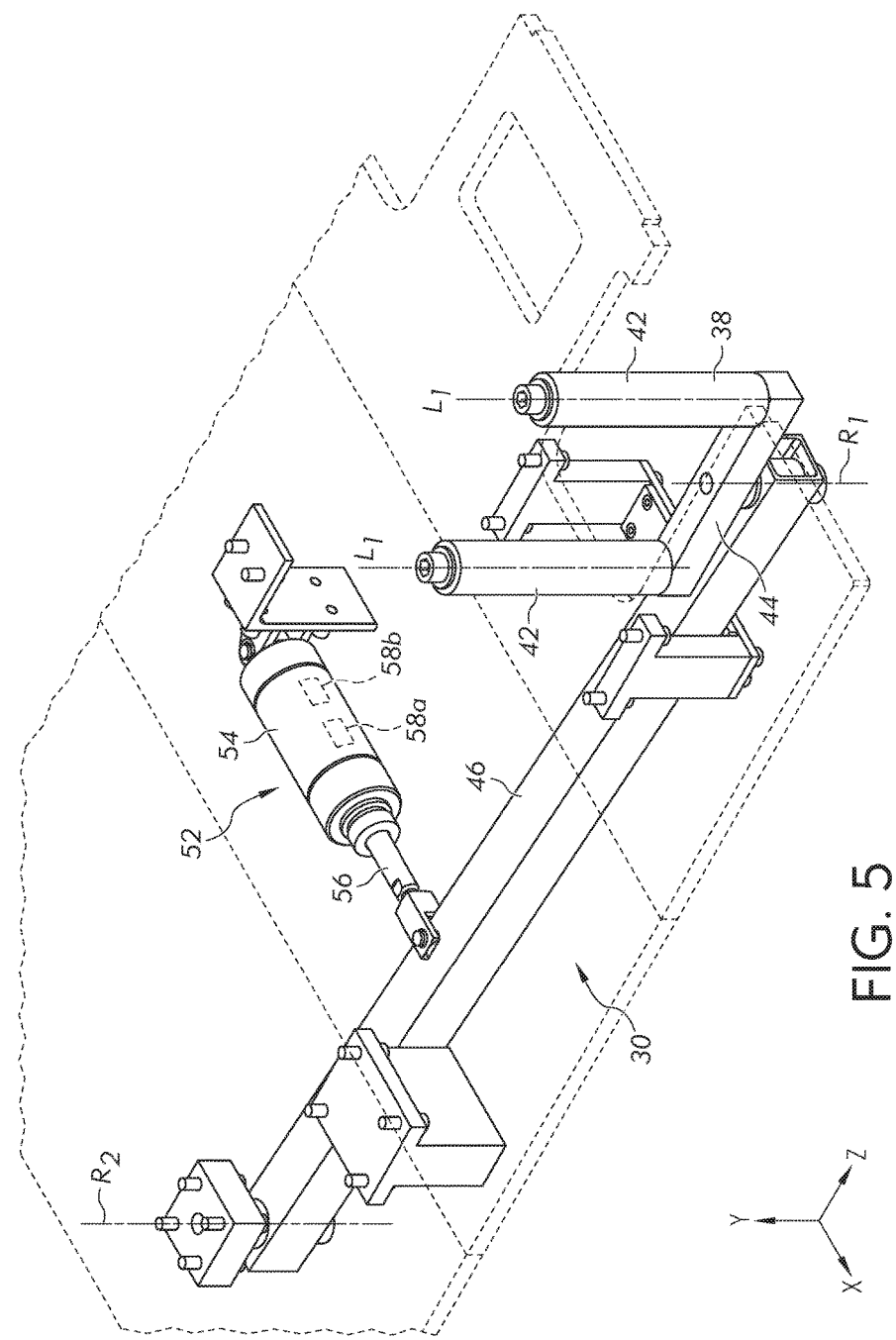
FIG. 5 is a perspective view of a first moving member of the input assembly.

For example, as shown in FIGS. 4 & 5, the first clamping mechanism 30 can be configured to clamp the boards 12 along the first reference axis X to inhibit movement of the boards 12 along the first reference axis X. More specifically, the first clamping mechanism 30 can include a first movable member 38 movably coupled to the tabletop 24 such that the first movable member 38 is translatable along (e.g., substantially parallel to) the first reference axis X. Moreover, the first clamping mechanism 30 can include one or more first counterparts 40 coupled to the tabletop 24 such that the first movable member 38 is translatable relative to each first counterpart 40 in order to clamp the plurality of boards 12 between the one or more first counterparts 40 and the first movable member 38.

The first movable member 38 of the first clamping mechanism 30 can comprise at least one elongated body 42, each elongated body 42 having a longitudinal axis $L_1$ that is substantially perpendicular to its axis of translation (e.g., the first reference axis X). In the illustrated embodiment, the first movable member 38 includes two elongated bodies 42 that are fixed relative to each other via a linkage 44 (see FIG. 5). However, the first movable member 38 may include just a single elongated body 42 in other examples. Moreover, the first movable member 38 may include more than two elongated bodies 42 fixed to each other in some examples.

The first movable member 38 can be rotatably coupled to an arm 46 such that the first movable member 38 is rotatable about a first rotational axis $R_1$ that is substantially perpendicular to its axis of translation (e.g., the first reference axis X). Moreover, the arm 46 can be rotatably coupled to the tabletop 24 such that the arm 46 is rotatable about a second rotational axis $R_2$ that is substantially parallel to and spaced a distance from the first rotational axis $R_1$. In this manner, the arm 46 can be rotated about the second rotational axis $R_2$ to translate the first movable member 38 along the first reference axis X. In particular, the arm 46 can be rotated about the second rotational axis $R_2$ to translate the first movable member 38 toward the first counterpart 40 and clamp the plurality of boards 12 between the first counterpart 40 and the first movable member 38. Moreover, because the first movable member 38 is rotatable about a first rotational axis $R_1$, the elongated bodies 42 of the first movable member 38 can rotate about first rotational axis $R_1$ as the elongated bodies 42 engage the plurality of boards 12 to adjust for various curvatures/shapes of the boards 12 along the third reference axis Z.

Preferably, the first rotational axis $R_1$ of the first movable member 38 is spaced a sufficient distance from the second rotational axis $R_2$ of the arm 46 such that rotation of the arm 46 and first movable member 38 about the second rotational axis $R_2$ causes the first movable member 38 to translate along a given portion of the first reference axis X in a substantially linear manner. Indeed, it is to be appreciated that as the distance between the first rotational axis $R_1$ and second rotational axis $R_2$ approaches infinite, the first movable member 38 will translate along longer portions of the first reference axis X in a substantially linear manner. Preferably, the first rotational axis $R_1$ and second rotational axis $R_2$ will be spaced apart by a distance that is greater than or equal to 0.5 meters, and more preferably, greater than or equal to 0.7 meters. However, the first rotational axis $R_1$ and second rotational axis $R_2$ may be spaced apart by shorter distances in some examples.

As shown in FIG. 4, the first counterpart(s) 40 of the first clamping mechanism 30 can each comprise an elongated body 48 that is fixed to the tabletop 24, the elongated body 48 having a longitudinal axis $L_2$ that is substantially perpendicular to the first movable member's axis of translation (e.g., the first reference axis X). Moreover, the first counterpart(s) 40 can each comprise one or more bearings 50 rotatably coupled to its elongated body 48 such that each bearing 50 is rotatable about the longitudinal axis $L_2$ of the elongated body 48. In this manner, the rotatable bearing(s) 50 can facilitate sliding of the boards 12 along the first counterpart(s) 40 in the feeding direction D.

In the illustrated embodiment, the first clamping mechanism 30 includes multiple (e.g., five) counterparts 40 that are coupled to the tabletop 24 such that longitudinal axes $L_2$ of the counterparts 40 are coplanar (i.e., on a vertical plane that is substantially parallel to the third reference axis Z). In this manner, the boards 12 can be pressed against two or more of the counterparts 40 (by, for example, the first movable member 38) to facilitate alignment of the boards 12 along the third reference axis Z. However, the first clamping mechanism 30 can comprise any number of counterparts 40 in other examples. Moreover, in embodiments in which the first clamping mechanism 30 includes multiple counterparts 40, the longitudinal axes $L_2$ of the counterparts 40 may not be coplanar in some examples.

In some examples, the first clamping mechanism 30 can comprise a drive mechanism 52 (see FIG. 5) that is operable to translate the first movable member 38 relative to the first counterpart(s) 40 along its axis of translation (e.g., the first reference axis X). In the illustrated embodiment, the drive mechanism 52 corresponds to a linear actuator having a main body 54 (e.g., cylinder housing) and a rod 56 (e.g., piston rod) that is movable relative to the main body 54 in a linear manner. The main body 54 is coupled (e.g., fixed or pivotally attached) to the tabletop 24, while the rod 56 is pivotally attached to the arm 46 of the first clamping mechanism 30. In this manner, the rod 56 can be moved relative to the main body 54 in a linear manner to rotate the arm 46 about the second rotational axis $R_2$, thereby causing the first movable member 38 to translate relative to the first counterpart(s) 40 along its axis of translation. However, it is to be appreciated that the drive mechanism 52 can comprise alternative configurations in other embodiments that are operable to translate the first movable member 38 relative to the first counterpart(s) 40 along its axis of translation.

The drive mechanism 52 can be operated to translate the first movable member 38 along the first reference axis X between a released state and an engaged state. As discussed below, either or both of the released state and engaged state can be a predetermined state that is based on one or more parameters of the first clamping mechanism 30.

For instance, in some examples, one or both of the released state and engaged state of the first movable member 38 can be a predetermined state that is based on a location of the first movable member 38 or corresponding structure (e.g., a structure whose location will correlate to a location of the first movable member 38). For example, the released state can correspond to a state in which the first movable member 38 is positioned at a predetermined location along the first reference axis X. In addition or alternatively, the engaged state can correspond to a state in which the first movable member 38 is positioned at a different predetermined location along the first reference axis X.

In some examples, one or both of the released state and engaged state of the first movable member 38 can be a predetermined state based on a load (i.e., force, pressure, etc.) being applied to the first movable member 38 or corresponding structure (i.e., structure upon which a corresponding load is applied when a load is placed on the first movable member 38). For example, the released state can correspond to a predetermined state in which no load is being applied to the first movable member 38. In other words, the released state can correspond to a state in which the first movable member 38 is not pressing any boards 12 against the first counterpart(s) 40. In addition or alternatively, the engaged state can correspond to a state in which a predetermined load is being applied to the first movable member 38 or corresponding structure. In other words, the engaged state can correspond to a state in which the first movable member 38 is pressing the plurality of boards 12 against the first counterpart(s) 40 with a force corresponding to the predetermined load.

In some examples, the first clamping mechanism 30 can include one or more sensors that are configured to detect one or more parameters of the first clamping mechanism 30, which can indicate whether the first movable member 38 is in its predetermined released state or predetermined engaged state. For instance, the drive mechanism 52 can include one or more position sensors 58a that can detect the position of its rod 56, which will correlate to the position of the first movable member 38 along the first reference axis X. In addition or alternatively, the drive mechanism 52 can include one or more load sensors 58b (e.g., pneumatic pressure sensors or axial force sensors) that can detect a load being applied to its rod 56, which will correlate to the load being applied to/by the first movable member 38. In this manner, the first clamping mechanism 30 can detect the position of the first movable member 38 and/or the load being applied to/by the first movable member 38, and therefore can detect whether the first movable member 38 is in its predetermined released state or predetermined engaged state.

In some examples, the controller 20 of the control system 18 (see FIGS. 1 & 2) can be in communication with the drive mechanism 52 of the first clamping mechanism 30 and can be configured to selectively operate the drive mechanism 52 to translate the first movable member 38 between the predetermined released state and predetermined engaged state. In such examples, the controller 20 can be in communication with the one or more of the sensors 58a, 58b described above. Moreover, the predetermined released state and predetermined engaged state can be programmed into the controller 20. In this manner, the control system 18 can selectively operate the drive mechanism 52 to translate the first movable member 38 between the programmed states, based on the detected parameters of the sensor(s).

The first clamping mechanism 30 as described above can thus be operated to clamp the boards 12 along the first reference axis X by translating the first movable member 38 along the first reference axis X in order to clamp the plurality of boards 12 between the first counterpart(s) 40 and the first movable member 38. However, it is to be appreciated that the first clamping mechanism 30 can comprise alternative configurations in other embodiments that can similarly clamp the boards 12 along the first reference axis X and/or other reference axes (e.g., second reference axis Y and/or third reference axis Z). The first clamping mechanism 30 can be configured in any manner that enables the first clamping mechanism 30 to clamp the boards 12 along one or more reference axes by translating a movable member relative to a counterpart along the respective one or more reference axes.

Figure 6:
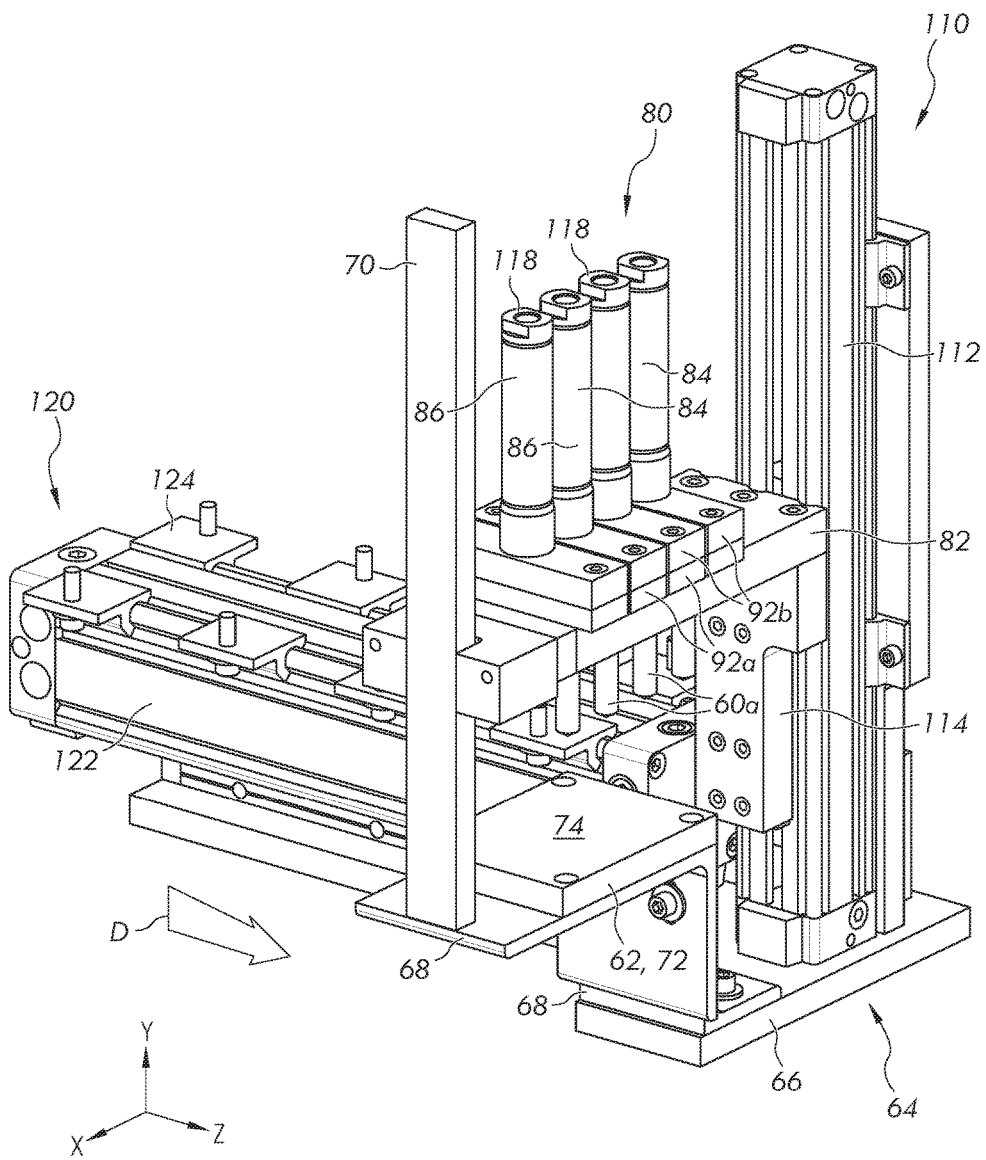
FIG. 6 is a perspective view of a second clamping mechanism of the input assembly.
Figure 7:
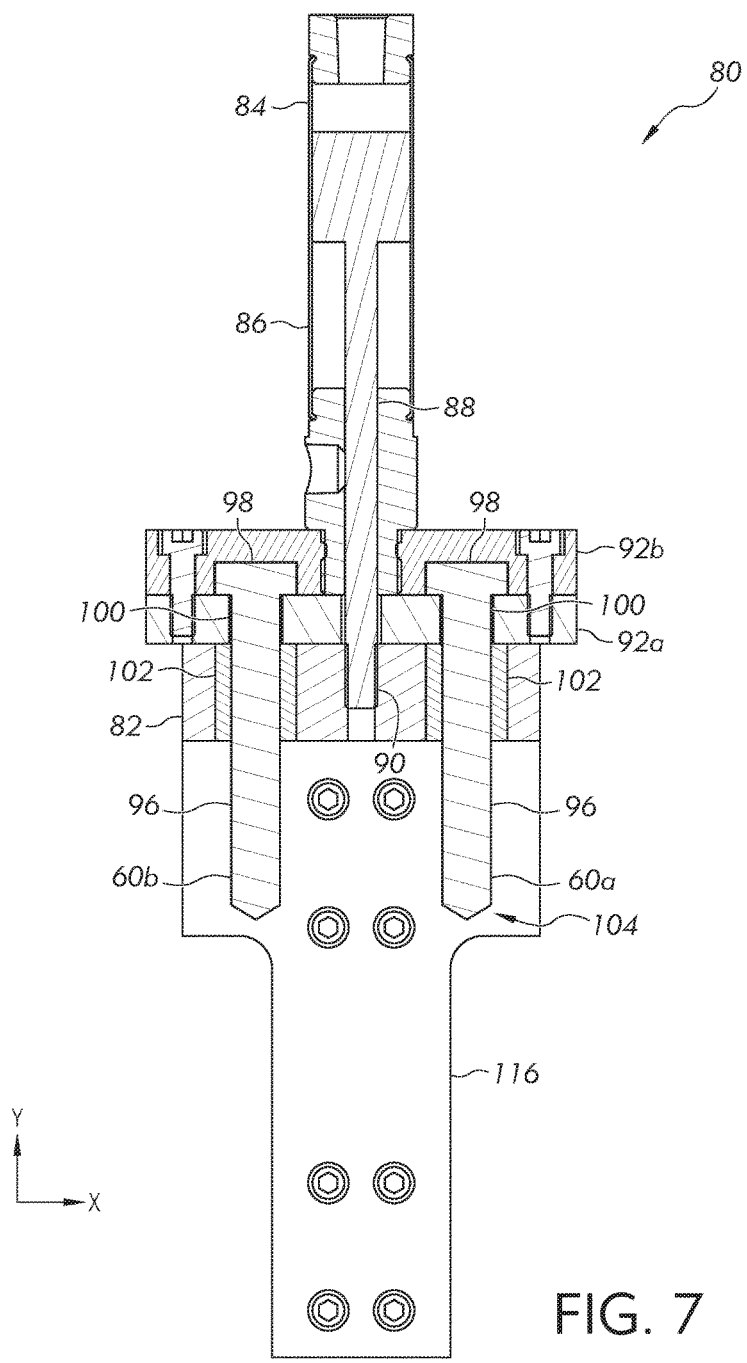
FIG. 7 is a cross-section view of an actuator assembly of the second clamping mechanism.

As shown in FIGS. 4, 6 & 7, the second clamping mechanism 32 can be configured to clamp the boards 12 along the second reference axis Y to inhibit movement of the boards 12 along the second reference axis Y. For instance, the second clamping mechanism 32 can include a plurality of second movable members 60 movably coupled to the tabletop 24 such that each movable member 60 is translatable along (e.g., substantially parallel to) the second reference axis Y. Moreover, the second clamping mechanism 32 can include a second counterpart 62 coupled to the tabletop 24 such that each second movable member 60 is translatable relative to the second counterpart 62 in order to clamp an associated one of the boards 12 between the second counterpart 62 and the second movable member 60.

More specifically, the second clamping mechanism 32 can include a carriage 64 that is coupled (e.g., fixed or movably attached) to the tabletop 24. The carriage 64 can comprise, for example, one or more members that are fixed to (e.g., integrally formed with or separately attached to) each other to form the carriage 64. For instance, in the illustrated embodiment, the carriage 64 comprises a bottom plate 66, a pair of angle brackets 68, and a rail 70 that are fixed to each other.

The second clamping mechanism 32 can further include a gripping member 72 that is fixed to the carriage 64 and defines the second counterpart 62 of the second clamping mechanism 32. The gripping member 72 is a pad of material that defines a support surface 74 for the boards 12. The support surface 74 can be substantially horizontal in orientation. Moreover, the material of the gripping member 72 preferably has a high coefficient of friction that can facilitate gripping of the boards 12 when the boards 12 are pressed against the gripping member 72 (by, for example, the second movable members 60). For instance, the gripping member 72 can comprise a rubber material such as, for example, neoprene. However, the gripping member 72 can comprise other orientations and materials in other embodiments.

The second clamping mechanism 32 can further include an actuator assembly 80 that is slidably coupled to the carriage 64. As shown in FIGS. 6 & 7, the actuator assembly 80 includes a pin plate 82 that is slidably coupled to the rail 70 of the carriage 64 such that the pin plate 82 is translatable along (e.g., substantially parallel to) the second reference axis Y. The actuator assembly 80 further includes a plurality of linear actuators 84 that are coupled to the pin plate 82. Each linear actuator 84 includes a main body 86 (e.g., cylinder housing) and a rod 88 (e.g., piston rod) that is movable relative to the main body 86 in a linear manner between an extended and retracted position. In particular, the rod 88 of each linear actuator 84 is threadably inserted into an associated threaded aperture 90 in the pin plate 82 to fix the rod 88 to the pin plate 82. Meanwhile, the main body 86 of each linear actuator 84 is fixed to a pair of retainment plates 92a, 92b.

The second movable members 60 of the second clamping mechanism 32 can correspond to pins that are fixed to the retainment plates 92a, 92b of the actuator assembly 80. In particular, each movable member 60 can comprise a shaft 96 and a head 98 and can be fixed to a pair of retainment plates 92a, 92b by inserting the shaft 96 through an aperture 100 in the lower retainment plate 92a and then fixing the upper retainment plate 92b to the lower retainment plate 92a such that the upper retainment plate 92b encloses and covers the head 98 of the movable member 60. The movable members 60 can be fixed to the retainment plates 92a, 92b such that their shafts 96 extend longitudinally along (e.g., substantially parallel to) the second reference axis Y and through corresponding pin holes 102 in the pin plate 82. The pin holes 102 of the pin plate 82 are configured to permit sliding of the movable members 60 through the pin holes 102 along (e.g., substantially parallel to) the second reference axis Y.

In the illustrated embodiment, each linear actuator 84 of the actuator assembly 80 is associated with a pair 104 of movable members 60, and each pair 104 has a distal member 60a and a proximal member 60b, the distal member 60a being downstream of the proximal member 60b along the feeding direction D. Moreover, the pairs 104 of movable members 60 are aligned along the first reference axis X such that the distal members 60a of the pairs 104 are aligned along a common plane (e.g., a vertical plane that is substantially parallel to the first reference axis X), and the proximal members 60b of the pairs 104 are aligned along a separate common plane (e.g., a vertical plane that is substantially parallel to the first reference axis X).

As noted above, the rods 88 of the linear actuators 84 are movable relative to their associated main bodies 86 in a linear manner between an extended position and a retracted position. Moreover, the rod 88 of each linear actuator 84 is fixed to the pin plate 82 while the main body 86 of each linear actuator 84 is fixed a pair of retainment plates 92a, 92b, which are fixed a pair 104 of movable members 60. Thus, when a rod 88 of a linear actuator 84 is in a retracted position (see e.g., FIG. 7), the retainment plates 92a, 92b associated with the linear actuator 84 will be pressed against the pin plate 82, and the heads 98 of the associated movable members 60 will be drawn close to the pin plate 82. On the other hand, when a rod 88 of a linear actuator 84 is in an extended position, the retainment plates 92a, 92b associated with the linear actuator 84 will be separated from the pin plate 82, and the heads 98 of the associated movable members 60 will be drawn away from the pin plate 82.

When a linear actuator 84 is energized, its rod 88 will be drawn to the retracted position (see e.g., FIG. 7), thereby causing the retainment plates 92a, 92b associated with the linear actuator 84 to press against the pin plate 82 and drive the associated movable members 60 toward the second counterpart 62 of the second clamping mechanism 32. Conversely, when a linear actuator 84 is de-energized, its main body 86 and rod 88 will be free to translate relative to each other, and its associated retainment plates 92a, 92b and movable members 60 will be free to translate relative to pin plate 82.

As noted above, the pin plate 82 is slidably coupled to the rail 70 of the carriage 64 such that the pin plate 82 is translatable along (e.g., substantially parallel to) the second reference axis Y. In this manner, the pin plate 82 can be translated toward the second counterpart 62 of the second clamping mechanism 32 to translate the one or more of the second movable members 60 into engagement with the boards 12. In this engaged state, the linear actuators 84 of the actuator assembly 80 can be energized, thereby driving the engaged movable members 60 against their associated boards 12 to clamp the boards 12 against the second counterpart 62.

In some examples, the second clamping mechanism 32 can include a drive mechanism 110 (see e.g., FIG. 6) that is operable to translate the second movable members 60 along (e.g., substantially parallel to) the second reference axis Y. In the illustrated example, the drive mechanism 110 corresponds to a linear actuator having a main body 112 (e.g., cylinder housing) and a carrier 114 that is movable relative to the main body 112 in a linear manner. The main body 112 is fixed to the carriage 64 of the second clamping mechanism 32, while the carrier 114 is fixed to the pin plate 82 of the actuator assembly 80. In this manner, the carrier 114 can be moved relative to the main body 112 in a linear manner to translate the pin plate 82 (and the second movable members 60 coupled thereto) along the second reference axis Y.

The drive mechanism 110 can be operated to translate the second movable members 60 along the second reference axis Y between a released state and an engaged state. Either or both of the released state and engaged state can be a predetermined state that is based on one or more parameters of the second clamping mechanism 32. For example, as discussed further below, one or both of the released state and engaged state can be a predetermined state based on a retracted/extended state of the rods 88 of the linear actuators 84.

More specifically, as the drive mechanism 110 translates the pin plate 82 of the actuator assembly 80 along the second reference axis Y, the linear actuators 84 can be de-energized. As discussed above, this will permit the main bodies 86 and rods 88 of the linear actuators 84 to move freely relative to each other, which in turn will permit the retainment plates 92a, 92b and movable members 60 to translate relative to pin plate 82. Normally, the main bodies 86 of the de-energized linear actuators 84 will be biased (e.g., via gravity) toward the second counterpart 62 (along with the retainment plates 92a, 92b and movable members 60) such that the rods 88 will assume a retracted state. However, as the pin plate 82 is translated along the second reference axis Y toward the second counterpart 62, one or more of the movable members 60 will eventually engage one or more associated boards 12. Further translation of the pin plate 82 toward the second counterpart 62 will then cause the head(s) 98 of the engaged movable member(s) 60 to separate from the pin plate 82, which in turn will cause the retainment plates 92a, 92b and actuator body 86 associated with each engaged movable member 60 to separate from the pin plate 82. Enough translation of the pin plate 82 toward the second counterpart 62 will eventually cause one or more rods 88 of the linear actuators 84 to assume an extended position relative to its main body 86

Thus, the released state of the second movable members 60 can correspond to a predetermined state in which all the rods 88 of the actuator assembly 80 are in a retracted position. In other words, the released state can correspond to a state in which none of the second movable members 60 is engaging an associated board 12 in a manner that causes its associated rod 88 to move from its retracted state. Meanwhile, the engaged state can correspond to a state in which one or more of the rods 88 are in a retracted state. In other words, the engaged state can correspond to a state in which one or more of the second movable members 60 is engaging an associated board 12 in a manner that causes its associated rod 88 to assume an extended state.

In some examples, the second clamping mechanism 32 can include one or more sensors that are configured to detect one or more parameters of the second clamping mechanism 32, which can indicate whether the second movable members 60 are in the predetermined released state or predetermined engaged state. For instance, the linear actuators 84 of the actuator assembly 80 can each include a position sensor 118 that can detect a retracted and/or extended state of its associated rod 88. In this manner, the second clamping mechanism 32 can detect the extended and/or retracted state of the rods 88, and therefore can detect whether the second movable members 60 are in the predetermined released state or predetermined engaged state.

In some examples, the controller 20 of the control system 18 (see FIGS. 1 & 2) can be in communication with the drive mechanism 110 of the second clamping mechanism 32 and can be configured to selectively operate the drive mechanism 110 to translate the second movable members 60 coupled thereto between the predetermined released state and predetermined engaged state. In such examples, the controller 20 can be in communication with the sensors 118 described above. Moreover, the predetermined released state and predetermined engaged state can be programmed into the controller 20. In this manner, the control system 18 can selectively operate the drive mechanism 110 to translate the second movable members 60 between the programmed states, based on the detected parameters of the sensors 118.

While the second movable members 60 are in the engaged state, the linear actuators 84 of the actuator assembly 80 can be energized, which as described above, will operate to drive any engaged movable members 60 against their associated boards 12 to clamp the boards 12 against the second counterpart 62.

The second clamping mechanism 32 as described above is thus configured to clamp the boards 12 along the second reference axis Y by translating the plurality of second movable members 60 along (e.g., substantially parallel to) the second reference axis Y to engage the plurality of boards 12, and then energizing the linear actuators 84 of the actuator assembly 80. Moreover, because the second clamping mechanism 32 includes a plurality of second movable members 60, each movable member 60 can serve to clamp a different board 12 and adapt to that particular board's dimension along the second reference axis Y. Thus, the second clamping mechanism 32 as described above can collectively hold multiple boards 12 of varying dimensions.

However, it is to be appreciated that the second clamping mechanism 32 can comprise alternative configurations in other embodiments that can similarly clamp the boards 12 along the second reference axis Y and/or other reference axes (e.g., first reference axis X and/or third reference axis Z). The second clamping mechanism 32 can be configured in any manner that enables the second clamping mechanism 32 to clamp the boards 12 along one or more reference axes by translating a plurality of movable members relative to a counterpart along the respective one or more reference axes.

In some examples, the input assembly 14 can be configured to feed the boards 12 in the feeding direction D once clamped by one or both of the first and second clamping mechanisms 30, 32. For example, as shown in FIG. 6, the second movable members 60 of the second clamping mechanism 32 can be translatable along (e.g., parallel to) the third reference axis Z between a retracted state and an advanced state that is downstream of the retracted state in the feeding direction D.

In order to move the second movable members 60 along the third reference axis Z, the carriage 64 of the second clamping mechanism 32 can be movably coupled to the tabletop 24 such that the pin plate 82 (and second movable members 60 coupled thereto) is movable along (e.g., parallel to) the third reference axis Z. In particular, a drive mechanism 120 can be provided, which corresponds to a linear actuator having a main body 122 (e.g., cylinder housing) and a carrier 124 movably coupled to the main body 122 such that the carrier 124 is movable relative to the main body 122 in a linear manner. The carrier 124 can be fixed to the tabletop 24, and the carriage 64 of the second clamping mechanism 32 can be fixed to the main body 122. In this manner, the drive mechanism 120 can be operated to translate the second movable members 60 along the third reference axis Z between the advanced and retracted states.

Accordingly, the second clamping mechanism 32 can feed the boards 12 in the feeding direction D by first clamping the boards 12 with the second movable members 60 in their retracted state, and then advancing the second movable members 60 along the third reference axis Z to their advanced state. Preferably, the first movable member 38 of the first clamping mechanism 30 is not in its engaged state during translation of the second movable members 60 to their advanced state, so as not to impart any resistance to the advancement of the second movable members 60 (and boards 12). However, the first movable member 38 may nonetheless be in its engaged state during advancement in some examples. Indeed, the above described bearing(s) 50 of the first clamping mechanism 30 can facilitate advancement of the boards 12 along the third reference axis Z while the first movable member 38 is in its engaged state.

The input assembly 14 as described above thus permits the plurality of boards 12 to be placed on its tabletop 24 and clamped along two or more reference axes (e.g., the first reference axis X and second reference axis Y) by the first and second clamping mechanisms 30, 32 to hold the boards 12 in place while being cut by the cutting assembly 16. Moreover, in some examples, the input assembly 14 as described can feed the boards 12 in the feeding direction D toward the cutting assembly 16. However, it is to be appreciated that the input assembly 14 can comprise alternative configurations in other examples that similarly can clamp the boards 12 along two or more reference axes and feed the boards 12 along the feeding direction D.

Figure 8:
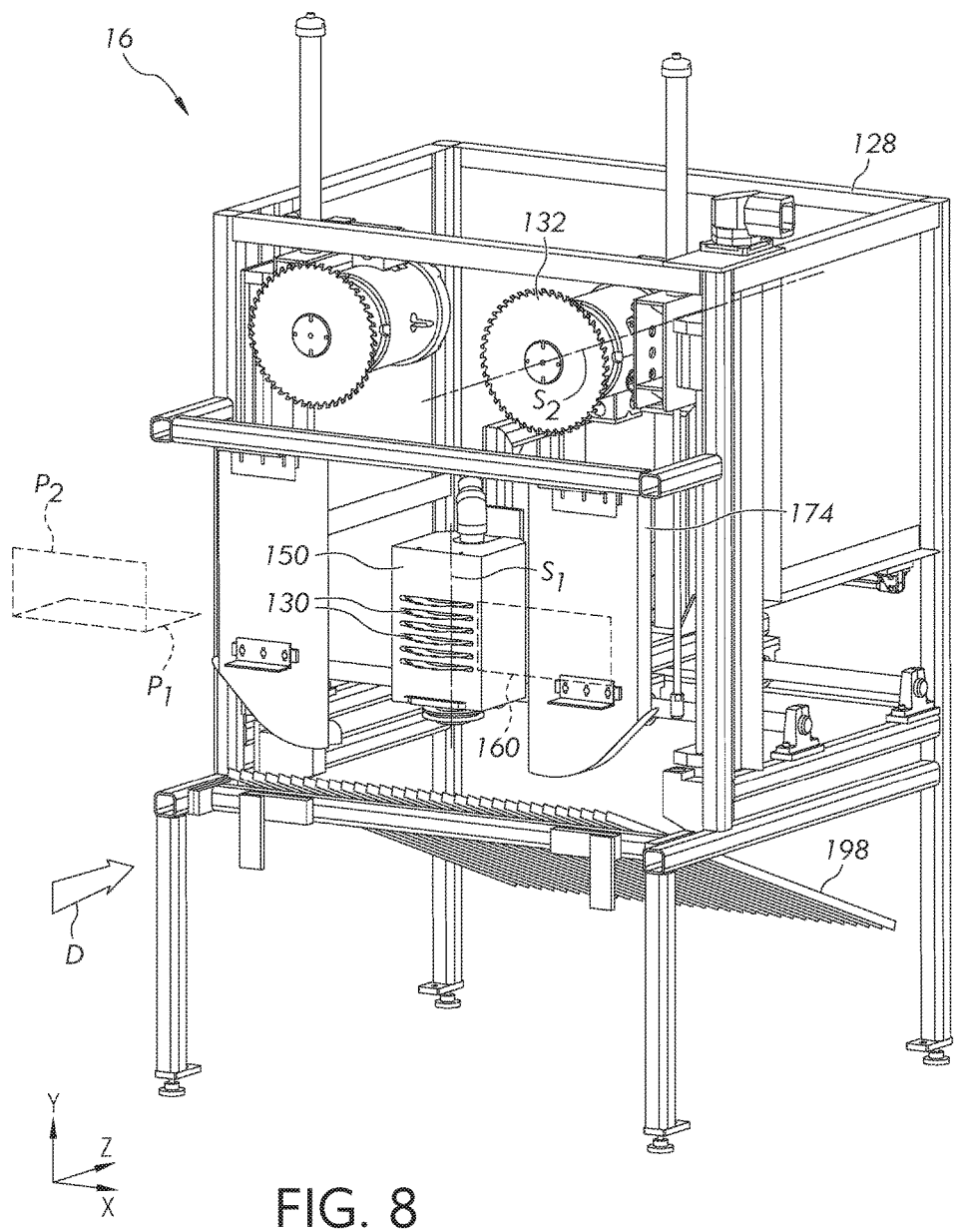
FIG. 8 is a perspective view of a cutting assembly of the apparatus, with various outer panels removed for the purpose of illustrating internal features.

Turning to FIGS. 8-12, the cutting assembly 16 will now be described in further detail. FIG. 8 is a perspective view of the cutting assembly 16, with various outer panels removed for the purpose of illustrating internal features. Meanwhile, FIGS. 9-12 illustrate various features of the cutting assembly 16 in isolation.

Figure 9:
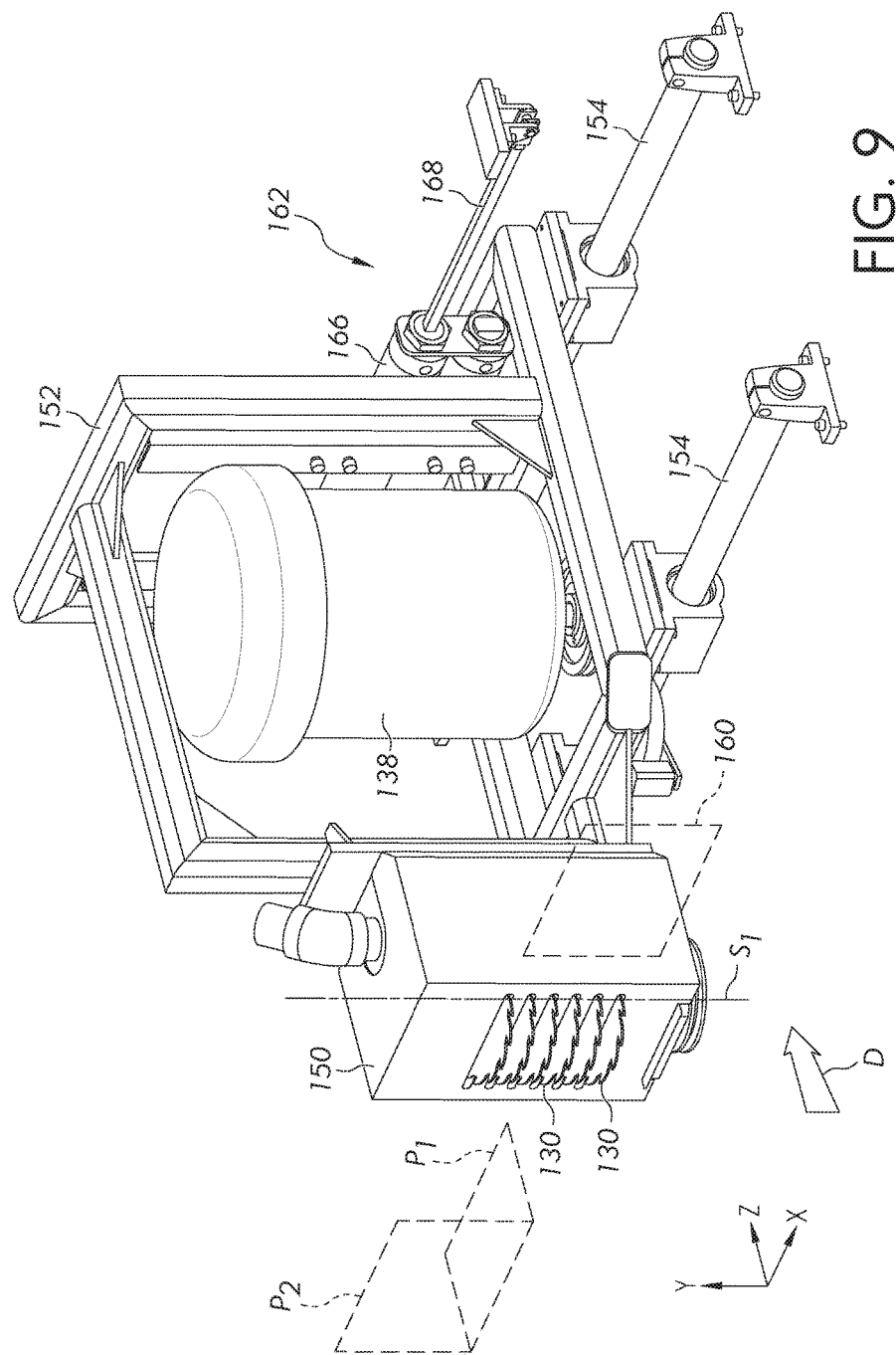
FIG. 9 is a perspective view of a plurality of first saw blades of the cutting assembly, and a drive mechanism of the plurality of first saw blades.
Figure 10:
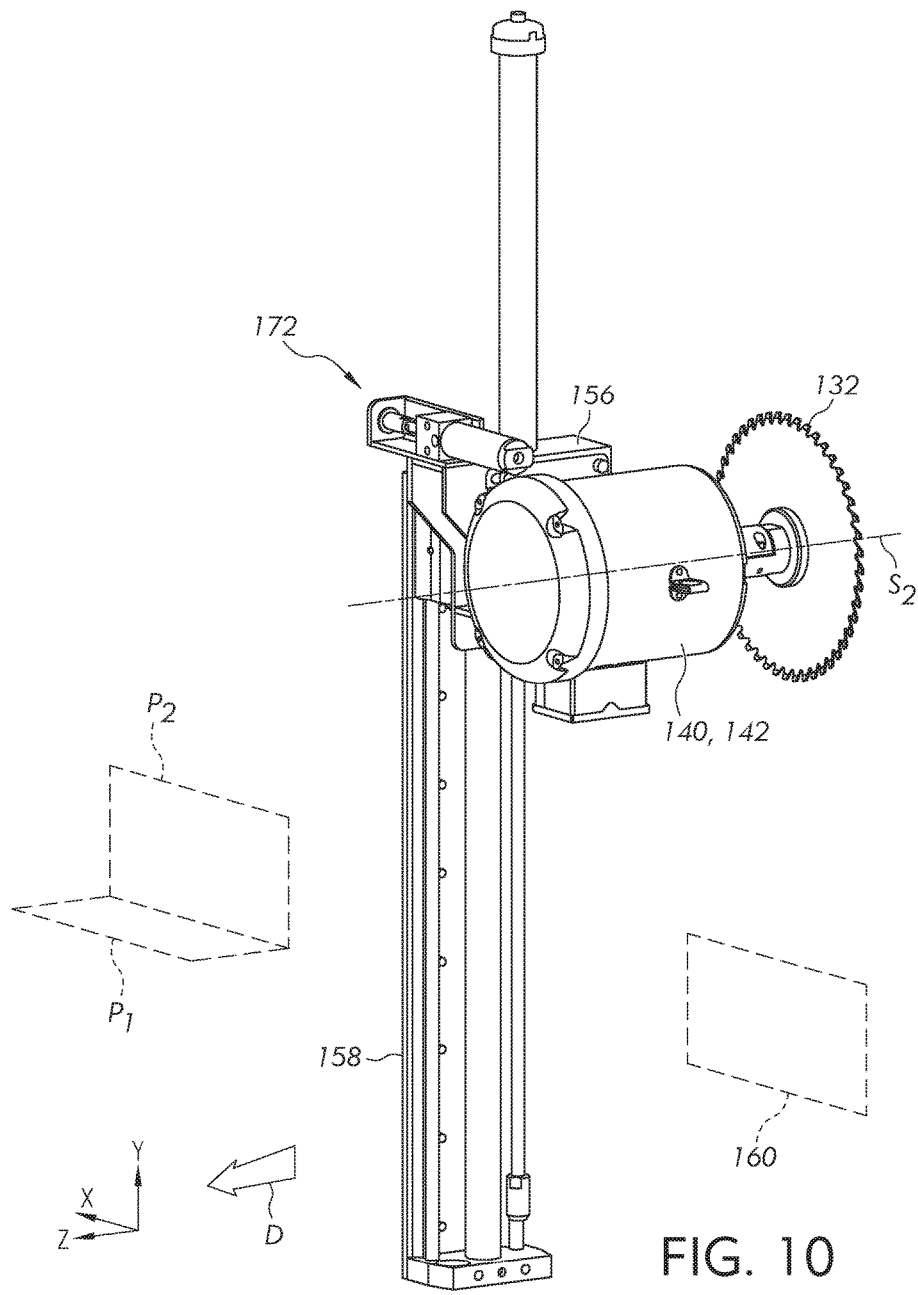
FIG. 10 is a perspective view of a second saw blade of the cutting assembly, and a drive mechanism of the second saw blade.

As shown in FIGS. 8-10, the cutting assembly 16 can include a chassis 128, a plurality of first saw blades 130 that are each configured to cut along (e.g., substantially parallel to) a first cutting plane $P_1$, and a second saw blade 132 that is configured to cut along (e.g., substantially parallel to) a second cutting plane $P_2$ that is transverse (e.g., perpendicular) to the first cutting plane $P_1$.

In the illustrated embodiment, the first and second saw blades 130, 132 are circular saw blades that can be rotated about associated axes $S_1$, $S_2$ to produce a cutting motion along their associated planes $P_1$,$P_2$. The axes $S_1$, $S_2$ are aligned substantially parallel to the third reference axis Z. Moreover, the first cutting plane $P_1$ is substantially horizontal and the second cutting plane $P_2$ is substantially vertical. However, either or both of the first and second cutting planes $P_1$,$P_2$ may comprise a different type of blade (e.g., band saw blade) and/or may require a different type of cutting motion (e.g., linear and/or reciprocating) in other embodiments. Moreover, either or both of the first and second cutting planes $P_1$,$P_2$ may have different orientations in other embodiments.

The cutting assembly 16 can further include one or more drive mechanisms that are operable to impart a cutting motion to the first and second saw blades 130, 132. For instance, as shown in FIG. 9, the cutting assembly 16 can include a drive mechanism 136 comprising a first motor 138 that is operable to impart a circular cutting motion to the first saw blades 130. Moreover, as shown in FIG. 10, the cutting assembly 16 can include another drive mechanism 140 comprising a second motor 142 that is operable to impart a circular cutting motion to the second saw blade 132. Either or both of the first and second motors 138, 142 can be a variable drive mechanism that permits the speed and/or force (e.g., torque) applied to its associated saw blade(s) to be adjustable by varying, for example, input frequency and voltage. In this manner, the motor(s) can be adjusted depending on, for example, the composition or thickness of the boards 12 to provide an appropriate speed and/or force for cutting. However, either or both of the first and second motors 138, 142 may not be variable in some examples. Moreover, the first and second motors 138, 142 can be configured to impart other non-rotary cutting motions in some embodiments.

The first and second saw blades 130, 132 can be movably coupled to the chassis 128 such that the one or more of the saw blades 130, 132 are translatable relative to the chassis 128 along one or more reference axes. For example, in the illustrated embodiment, the plurality of first saw blades 130 are coupled to a blade housing 150, which is fixed to a carriage 152 along with the first motor 138 (see e.g., FIG. 9). The carriage 152 is slidably coupled to a pair of rails 154 of the chassis 128 such that the carriage 152 (and first saw blades 130 coupled thereto) can translate relative to the chassis 128 along (e.g., substantially parallel to) the first reference axis X. Additionally, the second saw blade 132 is rotatably coupled to the second motor 142, which is fixed to a carrier 156 (see e.g., FIG. 10). The carrier 156 is slidably coupled to a rail 158 of the chassis 128 such that the carrier 156 (and second saw blade 132 coupled thereto) can translate relative to the chassis 128 along (e.g., substantially parallel to) the second reference axis Y.

Preferably, the first and second saw blades 130, 132 can be movably coupled to the chassis 128 in a manner such that the first and second saw blades 130, 132 can be moved through a common cutting zone. For instance, in the illustrated embodiment, the first and second saw blades 130 can translate through a common cutting zone 160. The dimension (e.g., width) of the cutting zone 160 along the first reference axis X is defined by the cutting path of the second saw blade 132, while the dimension (e.g., height) of the cutting zone 160 along the second reference axis Y is defined by the cutting path of the first saw blades 130.

The plurality of boards 12 can therefore be cut by locating a portion of each board 12 in the cutting zone 160 and translating the first and second saw blades 130, 132 through the cutting zone 160 with a cutting motion. Because the first and second cutting planes $P_1$,$P_2$ of the first and second saw blades 130, 132 are transverse to each other, translating the first and second saw blades 130, 132 through the common cutting zone 160 with a cutting motion can enable cutting of the boards 12 into a plurality of pieces that are smaller in multiple dimensions (e.g., width and length).

In some examples, the cutting assembly 16 can include one or more drive mechanisms that are operable to move the first and second saw blades 130, 132 relative to the chassis 128 along their associated reference axes. For instance, in the illustrated embodiment, the cutting assembly 16 includes a drive mechanism 162 for moving the plurality of first saw blades 130 along (e.g., substantially parallel to) the first reference axis X (see e.g., FIG. 9). The drive mechanism 162 corresponds to a linear actuator having a main body 166 (e.g., cylinder housing) and a rod 168 (e.g., piston rod) that is movable relative to the main body 166 in a linear manner. The main body 166 is fixed to the carriage 152 and the rod 168 is fixed to the chassis 128 such that actuation of the rod 168 relative to the main body 166 will cause the carriage 152 (and first saw blades 130 coupled thereto) to move along the rails 154 and translate relative to the chassis 128 along (e.g., substantially parallel to) the first reference axis X.

Additionally in the illustrated embodiment, the cutting assembly 16 includes another drive mechanism 172 for moving the second saw blade 132 along (e.g., substantially parallel to) the second reference axis Y (see e.g., FIG. 10). The drive mechanism 172 corresponds to a linear actuator that comprises the carrier 156 and rail 158 described above. The drive mechanism 172 can be operated to translate the carrier 156 (and the second saw blade 132 coupled thereto) along (e.g., substantially parallel to) the second reference axis Y relative to the rail 158.

In some examples, the controller 20 of the control system 18 (see FIGS. 1 & 2) can be in communication with the drive mechanisms 136, 140, 162, 172 described above and can be configured to selectively operate each drive mechanism to translate and/or impart a cutting motion to one or both of the first and second saw blades 130, 132. Moreover, as will be discussed later below, the controller 20 can be programmed to perform a cutting operation by operating the drive mechanisms 136, 140, 162, 172 in a particular manner.

The cutting assembly 16 as described above can thus perform a cutting operation by imparting a cutting motion to one or both of the first and second saw blades 130, 132. Moreover, in some cutting operations, one or both of the first and second saw blades 130, 132 can be translated relative to the chassis 128 while a cutting motion is being imparted. In particular, as discussed above, the first and second saw blades 130, 132 can be moved through (e.g., within, partially through, completely through, etc.) the common cutting zone 160 to cut the plurality of boards 12 into a plurality of smaller pieces (e.g., cubes).

However, it is to be appreciated that the cutting assembly 16 can comprise alternative configurations in other embodiments with one or more saw blades that can similarly perform a cutting operation on the boards 12. For instance, in some examples, the cutting assembly 16 may comprise a single first saw blade 130 and multiple second saw blades 132, or multiple first saw blades 130 and multiple second saw blades 132. In some examples, one or more of the first and second saw blades 130, 132 may be non-translatable or translatable along multiple reference axes. The cutting assembly 16 can comprise any number of saw blades configured in any manner that enables a cutting operation to be performed on the boards 12.

Figure 11:
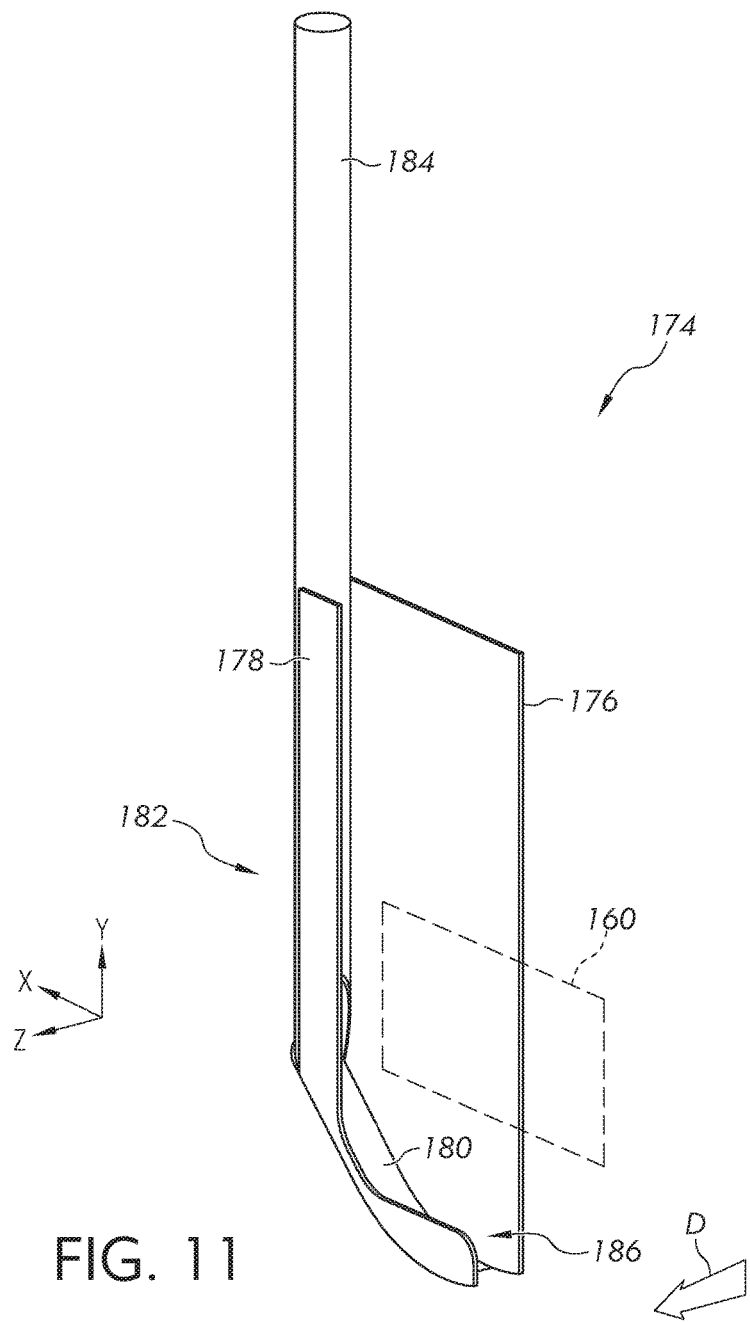
FIG. 11 is a perspective view of a saw guard of the cutting assembly.

In some examples, the cutting assembly 16 can include a saw guard 174 that is configured to shield a portion of the cutting zone 160 from objects other than the boards 12. More specifically, as shown in FIG. 11, the guard 174 can comprise a shield plate 176 that is aligned substantially vertical such that the shield plate 176 is substantially parallel to the first and second reference axes X, Y. The shield plate 176 is arranged slightly upstream of the cutting zone 160 along the feeding direction D such that objects travelling in the feeding direction D toward the cutting zone 160 can be blocked by the shield plate 176. However, at least a portion of the cutting zone 160 will be unobstructed by the shield plate 176 along the feeding direction D to permit the boards 12 to be fed to the cutting zone 160 for cutting.

In some examples, the guard 174 can be further configured to collect sawdust generated in the cutting zone 160 and enable removal the sawdust from the cutting assembly 16. More specifically, the guard 174 can include a back plate 178 that extends substantially parallel to the shield plate 176 and is located downstream of the shield plate 176 along the feeding direction such that the cutting zone 160 is located between the shield plate 176 and back plate 178. The guard 174 can further include a bottom plate 180 that extends between and connects the lower edges of the shield plate 176 and back plate 178, a side plate 182 that extends between and connects the side edges of the shield plate 176 and back plate 178, and a tube 184 that is aligned substantially vertical along the side plate 182.

The plates 176, 178, 180, 182 of the guard 174 are configured to define a channel 186 therebetween for collecting sawdust. In particular, the shield plate 176, back plate 178, and side plate 182 are configured such that as the first and second saw blades 130, 132 translate through the cutting zone 160 and produce sawdust, the saw dust can be (at least partially) contained by the plates 176, 178, 182 and deflected downward into the channel 186. Moreover, the tube 184 of the guard 174 can be coupled at a top end thereof to a vacuum source such that a vacuum can be generated within the tube 184 that removes sawdust collected in the channel 186. Preferably, the bottom plate 180 is angled and/or curved toward the tube 184 to facilitate the removal of sawdust from the channel 186 into the tube 184.

Figure 12:
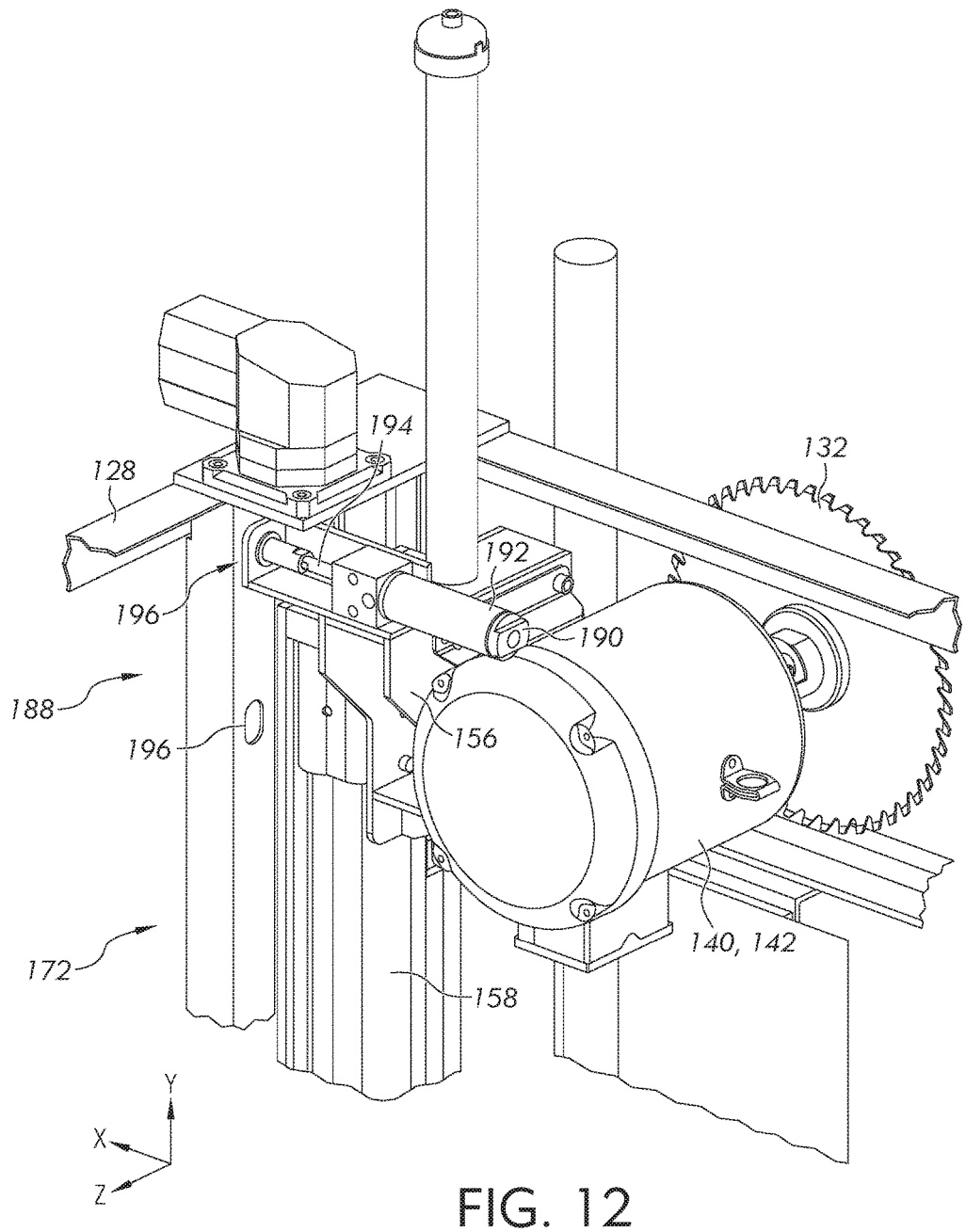
FIG. 12 is a perspective view of a locking mechanism for the second saw blade.

In some examples, the cutting assembly 16 can include one or more locking mechanisms that can inhibit the first saw blades 130 and/or second saw blade 132 from translating when a cutting operation is not being performed. For example, as shown in FIG. 12, the cutting assembly 16 can include a locking mechanism 188 for inhibiting translation of the second saw blade 132 along the second reference axis Y. The locking mechanism 188 comprises a linear actuator 190 having a main body 192 (e.g., cylinder housing) and a rod 194 (e.g., piston rod) that is movable relative to the main body 192 in a linear manner. The locking mechanism 188 further comprises one or more apertures 196 that can each receive the rod 194 of the linear actuator 190 to lock the second saw blade 132 along the second reference axis Y.

In the illustrated example, the apertures 196 are provided on (e.g., defined by) the chassis 128 of the cutting assembly 16. Meanwhile, the linear actuator 190 is coupled to the carrier 156 for the second saw blade 132 such that its main body 192 is fixed to the carrier 156. In this manner, the carrier 156 can be positioned along the rail 158 such that the rod 194 of the linear actuator 190 aligns with one of the apertures 196, and then the linear actuator 190 can be actuated to extend its rod 194 into the aperture 196 to lock the second saw blade 132 along the second reference axis Y.

Preferably, the linear actuator 190 is configured such that in a de-energized state, its rod 194 will be biased (e.g., via a spring) to its extended state. In this manner, if power for the linear actuator 190 is lost while the locking mechanism 188 is in a locked state, the locking mechanism 188 will remain locked. Moreover, the locking mechanism 188 is preferably configured such that the second saw blade 132 will be in a raised position away from the cutting zone 160 when the rod 194 of the locking mechanism 188 is engaged with an associated aperture 196.

The locking mechanism 188 described above can thus permit the second saw blade 132 to be locked along the second reference axis Y in a safe position when a cutting operation is not being performed. However, it is to be appreciated that the locking mechanism 188 can comprise other configurations that similarly lock the second saw blade 132 in other embodiments. Moreover, a similar locking mechanism can be provided to lock the first saw blades 130 along the first reference axis X when a cutting operation is not being performed.

In some examples, the cutting assembly 16 can include a tray 198 (see FIG. 8) that is arranged vertically below the cutting zone 160 such that the tray 198 can catch pieces that get cut from boards 12 in the cutting zone 160. In some examples, the tray 198 can be substantially horizontal in orientation. In other examples, the tray 198 can be angled such that pieces falling on the tray can be directed to another location. For example, in the illustrated embodiment, the tray 198 is angled downward along the feeding direction D such that pieces landing on the tray will be directed to a rear of the cutting assembly 16. However, the tray 198 may direct pieces toward other directions in other examples. Moreover, the tray 198 may be a bin or some other structure that collects the pieces.

The input assembly 14 and cutting assembly 16 described above are designed such that the boards 12 can be loaded onto the input assembly 14 and then cut by the cutting assembly 16. To load the boards 12 onto the input assembly 14, the boards 12 can be initially placed on the tabletop 24 while the movable members 38, 60 of the first and second clamping mechanisms 30, 32 are in their released states (see e.g., FIGS. 2-4). In particular, the boards 12 can be arranged sideways on the tabletop 24 such that the boards 12 extend lengthwise along the third reference axis Z and are stacked along the first reference axis X, with a portion (e.g., intermediate portion 202) of each board 12 extending between the first movable member 38 and first counterpart(s) 40 of the first clamping mechanism 30, and between the second movable members 60 and second counterpart 62 of the second clamping mechanism 32. The first and second clamping mechanisms 30, 32 can then be operated (e.g., via the control system 18) to translate their movable members 38, 60 to their engaged state.

In some examples, the boards 12 can be loaded on the tabletop 24 such that a portion (e.g., end portion 204) of each board 12 is located in the cutting zone 160 of the cutting assembly 16. In the illustrated example, the cutting zone 160 is downstream along the feeding direction D from a distal edge 206 of the tabletop 24 of the input assembly 14. As such, the boards 12 will be cantilevered from the input assembly 14 when extending through (e.g., into) the cutting zone 160.

In other examples, the boards 12 can be loaded on the tabletop 24 such that the end portions 204 of the boards 12 are aligned with the distal edge 206 of the tabletop 24 (see e.g., FIG. 4). To facilitate alignment, the input assembly 14 can include a movable plate 208 that extends substantially parallel to the first and second reference axes X, Y and is arranged adjacent to the distal edge 206 of the tabletop 24. The movable plate 208 can be translatable along a reference axis (e.g., second reference axis Y) such that the movable plate 208 is movable between an extended and retracted position. In the extended position, the movable plate 208 can be arranged at least partially above the top surface 28 of the tabletop 24 along the second reference axis Y such that the movable plate 208 will form a barrier that prohibits positioning/advancement of the boards 12 substantially beyond the distal edge 206 of the tabletop 24. In the retracted position, the movable plate 208 can be arranged below the top surface 28 of the tabletop to permit the boards 12 to extend/advance past the distal edge 206 of the tabletop 24.

In some examples, the input assembly 14 can include a drive mechanism 210 that is operable to move the movable plate 208 between its retracted and extended positions. The drive mechanism 210 corresponds to a linear actuator having a main body 212 (e.g., cylindrical housing) that is fixed to the tabletop 24 and a carrier 214 that is fixed to movable plate 208 and movable relative to main body 212 in a linear manner. In this manner, the drive mechanism 210 can be operated (e.g., via the controller 20 of the control system 18) to move the movable plate 208 between its extended and retracted positions.

The movable plate 208 described above can thus be moved to its extended position to form a barrier that prohibits loading of the boards 12 substantially beyond the distal edge 206 of the tabletop 24. In this manner, the boards 12 can be aligned with the distal edge 206 by arranging the end portions 204 of the boards 12 to abut the movable plate 208. The movable plate 208 can then be moved to its retracted position and the first and second clamping mechanisms 30, 32 can be operated to clamp the boards 12 in position.

Figure 13:
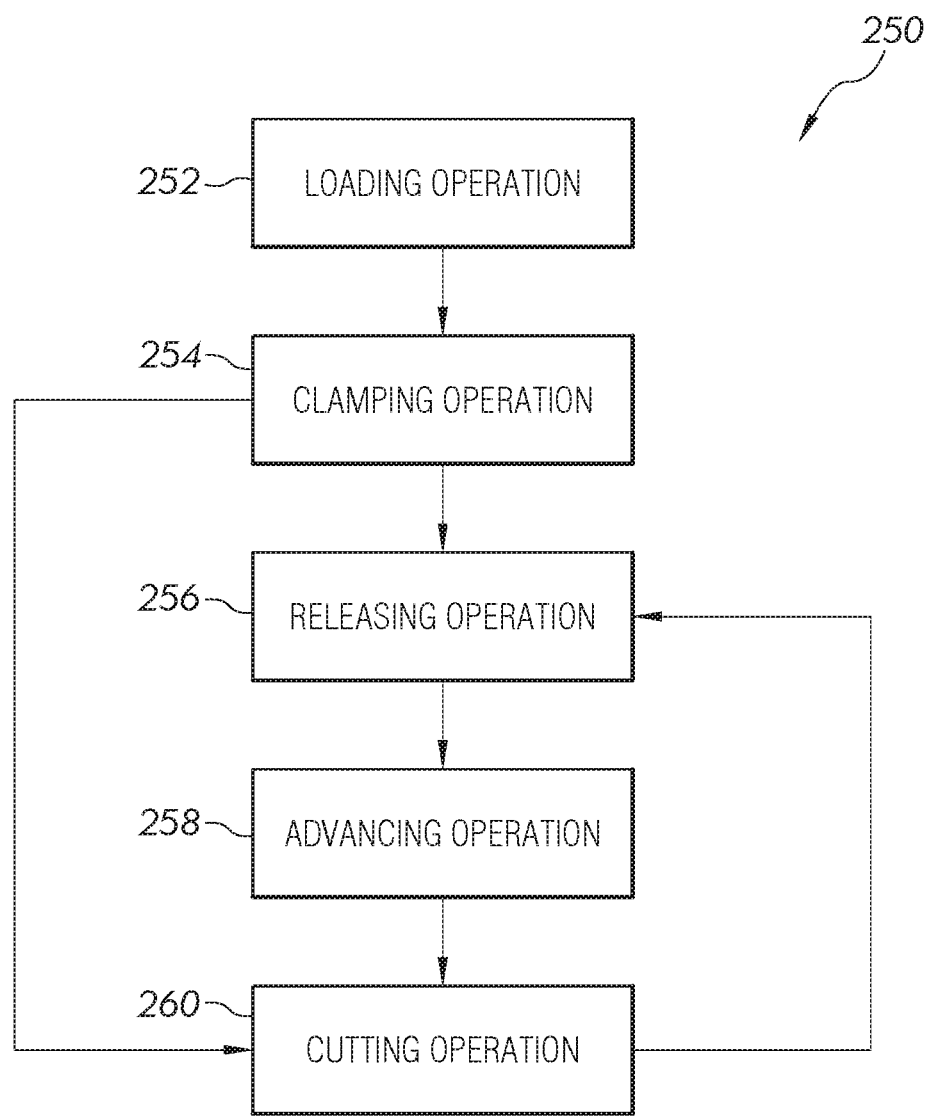
FIG. 13 is a flowchart illustrating a method that can be performed with the example apparatus.

Turning to FIG. 13, a method 250 of operating the above apparatus 10 will now be described. The method 250 can include a loading operation 252, a clamping operation 254, a releasing operation 256, an advancing operation 258, and/or a cutting operation 260, which are described in further detail below.

During the loading operation 252, the boards 12 can be loaded as described above such that the end portions 204 of the board 12 are either located in the cutting zone 160 or aligned with the distal edge 206 of the tabletop 24. In particular, the boards 12 can be arranged sideways on the tabletop 24 such that the boards 12 extend lengthwise along the third reference axis Z and are stacked along the first reference axis X, with a portion of each board 12 extending between the first movable member 38 and first counterpart(s) 40 of the first clamping mechanism 30, and between the second movable members 60 and second counterpart 62 of the second clamping mechanism 32. The first movable member 38 of the first clamping mechanism 30 can be in its released state during loading, and the second movable members 60 can be in their released state and advanced state during loading.

In loading operations 252 wherein the end portions 204 of the board 12 are aligned with the distal edge 206 of the tabletop 24, the drive mechanism 210 of the movable plate 208 can be operated to move the plate 208 to its extended position to facilitate alignment of the boards 12, and then the drive mechanism 210 can be operated to move the plate 208 to its retracted position once the boards 12 are aligned.

After the loading operation 252 is complete, the clamping operation 254 can be performed. During the clamping operation 254, the drive mechanism 52 of the first clamping mechanism 30 will be operated to translate the first movable member 38 along the first reference axis X from its released state to its engaged state, thereby clamping the boards along the first reference axis X. Moreover, the drive mechanism 110 of the second clamping mechanism 32 will be operated to translate the second movable members 60 along the second reference axis Y from their released state to their engaged state, and the linear actuators 84 of the actuator assembly 80 will then be energized to drive one or more of the movable members 60 against the boards 12, thereby clamping the boards 12 along the second reference axis Y. As discussed above, the engaged state of the first movable member 38 can be based on a location of the first movable member 60 (or corresponding structure) or a load being applied to the first movable member 60 (or corresponding structure), which can be detected using or more of the sensors 58a, 58b described above. Moreover, the engaged state of the second movable members 60 can correspond to a state in which one or more of the rods 88 of the actuator assembly 80 are in a retracted state, which can also be detected using or more of the sensors 118 described above.

After the clamping operation 256 is complete, the next operation(s) in the method 250 can depend on how the boards 12 were loaded during the loading operation 252. If the boards 12 were loaded such that the boards 12 were located in the cutting zone 160, then the method 250 can proceed to the cutting operation 260 (which is described later below). Alternatively, if the boards 12 were loaded such that the end portions 204 of the boards 12 were aligned with the distal edge 206 of the tabletop 24, then the method 250 can proceed to the releasing operation 256 and advancing operation 258 to feed the boards 12 to the cutting zone 160.

During the releasing operation 256, the drive mechanism 52 of the first clamping mechanism 30 will be operated to translate the first movable member 38 along the first reference axis X from its engaged state to its released state. Moreover, the linear actuators 84 of the actuator assembly 80 will be de-energized and the drive mechanism 110 of the second clamping mechanism 32 will be operated to translate the second movable members 60 along the second reference axis Y from their engaged state to their released state. Accordingly, the boards 12 will no longer be clamped by the first and second clamping mechanisms 30, 32.

Once the releasing operation 256 is complete, the advancing operation 258 can then be performed. During the advancing operation 258, the drive mechanism 120 of the input assembly 14 can be operated to translate the second movable members 60 along the third reference axis Z from their advanced state to their retracted state. Once retracted, the drive mechanism 110 of the second clamping mechanism 32 can be operated to translate the second movable members 60 to their engaged state, and the linear actuators 84 can be energized to drive one or more of the movable members 60 against the boards 12, thereby clamping the boards 12 along the second reference axis Y. The drive mechanism 120 can then be operated to translate the second movable members 60 along the third reference axis Z from their retracted state to their advanced state, which will cause the boards 12 to advance with the movable members 60 along the third reference axis Z such that the end portions 204 of the boards 12 become located in the cutting zone 160. The drive mechanism 52 of the first clamping mechanism 30 can then be operated to translate the first movable member 38 along the first reference axis X from its released state to its engaged state, thereby clamping the boards 12 along the first reference axis X.

Once the boards 12 are positioned in the cutting zone 160, the cutting operation 260 can be performed. During the cutting operation 260, the drive mechanisms 136, 140 can be operated to impart cutting motions to the first and second saw blades 130, 132. While a cutting motion is being imparted to the first saw blades 130, the drive mechanism 162 can be operated to move the first saw blades 130 along the first reference axis X through (e.g., within, partially-through, or completely through) the cutting zone 160 to cut the boards 12 along the first cutting plane $P_1$. Moreover, while a cutting motion is being imparted to the second saw blade 132, the drive mechanism 172 can be operated to move the second saw blade 132 along the second reference axis Y through (e.g., within, partially-through, or completely through) the cutting zone 160 to cut the boards 12 along the second cutting plane $P_2$. Preferably, the first and second saw blades 130, 132 are translated sequentially during the cutting operation 260 to avoid interference with each other within the cutting zone 160.

As discussed above, the first and second cutting planes $P_1, P_2$ can be substantially perpendicular to each other, with the first cutting plane $P_1$ being substantially vertical and parallel to the first reference axis X and the second cutting plane $P_2$ being substantially horizontal and parallel to the second reference axis Y. Moreover, the boards 12 in the loading operation 252 can be arranged sideways and stacked along the first reference axis X. By this configuration, if the first and second saw blades 130, 132 are translated sequentially during the cutting operation 260 such that the second saw blade 132 translates after the first saw blades 130, the boards 12 can be cut into a plurality of cuboid shaped pieces. More specifically, the initial movement/cutting of the first saw blades 130 will cut the end portion 204 of each board 12 horizontally into a plurality of fingers that are vertically aligned. These fingers will remain connected to their associated boards 12 until the latter movement/cutting of the second saw blade 132, which will cut through the boards 12 vertically and sever the fingers from their associated boards 12. The severed pieces will be substantially cuboid in shape. Moreover, the severed pieces once cut from the boards 12 can fall onto the tray 198 of the cutting assembly 16 and be directed to another location by the tray 198.

Once the cutting operation 260 is complete and the boards 12 have been cut to separate one or more pieces from the boards 12, the remaining portions of the boards 12 will still be clamped to the input assembly 14 by the first and second clamping mechanisms 30, 32. At this point, the method 250 can be considered complete. However, in some examples, the method 250 can include additional operations to further cut the remaining portions of the boards 12. More specifically, the method 250 can repeat the releasing, advancing, and cutting operations 256, 258, 260 described above to feed the remaining portions into the cutting zone 160 and cut the remaining portions. Indeed, the releasing, advancing, and cutting operations 256, 258, 260 can be repeated multiple times as desired to further cut the boards 12.

The method 250 described above can thus cut the boards 12 into a plurality of smaller pieces, which can be substantially cuboid in shape. Although certain operations in the method 250 have been described as having a sequential relationship in which one operation is performed upon completion of another, it is to be appreciated that such operations may not necessarily be sequential in some examples and may indeed overlap in terms of their sequence. For example, the cutting operation 260 may be initiated prior to or during the clamping, releasing, and advancing operations 254, 256, 258 by imparting cutting motions to the first and/or second saw blades 130, 132 prior to or during said operations. The sequence described above with respect to the method 250 is only an example and not intended to limit the scope of the invention.

Also, it is to be appreciated that certain operations may be omitted from the method 250 in some examples. For instance, as described above, if the boards 12 were loaded during the loading operation 252 such that the boards 12 were located in the cutting zone 160, then the method 250 may proceed to the cutting operation 260 and omit the releasing and clamping operations 256, 258. The various operations described above are merely exemplary and not intended to limit the scope of the invention.

As discussed above, the apparatus 10 can include a control system 18 having a programmable controller 20 (e.g., a central processing unit (CPU)) that can operate one or more drive mechanisms of the input assembly 14 and cutting assembly 16 to perform one or more operations. In particular, the controller 20 can be in communication with any one or more of the drive mechanisms 52, 110, 120, 136, 140, 162, 172, 210 described above, as well as any one or more of the sensors 58a, 58b, 120 described above. Moreover, the controller 20 can be programmed to store any one or more of the predetermined states described above. In this manner, the controller 20 can be configured to automatically perform or facilitate any one or more of the operations 252, 254, 256, 258, 260 in the method 250 described above by operating one or more of the drive mechanisms 52, 110, 120, 136, 140, 162, 172, 210 accordingly.

For example, the controller 20 can be configured to facilitate the loading operation 252 by operating the drive mechanism 210 of the movable plate 208 to move the plate 208 to its extended position to facilitate alignment of the boards 12 along the distal edge 206 of the tabletop 24. Once the boards 12 have been aligned, the controller 20 can then operate the drive mechanism 210 to move the plate 208 to its retracted position.

In addition or alternatively, the controller 20 can be configured to perform the clamping operation 254 by operating the drive mechanism 52 of the first clamping mechanism 30 to translate the first movable member 38 along (e.g., substantially parallel to) the first reference axis X from its released state to its engaged state, and operating the drive mechanism 110 of the second clamping mechanism 32 to translate the plurality of second movable members 60 along (e.g., substantially parallel to) the second reference axis Y from their released state to their engaged state.

In addition or alternatively, the controller 20 can be configured to perform the cutting operation 260 by operating the drive mechanism 136 of the first saw blades 130 to impart a cutting motion to the first saw blades 130, operating the drive mechanism 140 of the second saw blade 132 to impart a cutting motion to the second saw blade 132, operating the other drive mechanism 162 of the first saw blades 130 to translate the first saw blades 130 along the first reference axis X, and operating the other drive mechanism 172 of the second saw blade 132 to translate the second saw blade 132 along the second reference axis Y.

In addition or alternatively, the controller 20 can be configured to perform the releasing operation 254 by operating the drive mechanism 52 of the first clamping mechanism 30 to translate the first movable member 38 along the first reference axis X from its engaged state to its released state, and operating the drive mechanism 110 of the second clamping mechanism 32 to translate the plurality of second movable members 60 along the second reference axis Y from its engaged state to its released state.

In addition or alternatively, the controller 20 can be configured to perform the advancing operation 256 by operating the drive mechanism 120 of the input assembly 14 to translate the plurality of second movable members 60 along the third reference axis Y from their advanced state to their retracted state, and then operating the drive mechanism 110 of the second clamping mechanism 32 to translate the plurality of second movable members 60 along the second reference axis Y from their released state to their engaged state, and then operating the drive mechanism 120 of the input assembly 14 to translate the plurality of second movable members 60 along the third reference axis Y from their retracted state to their advanced state.

The controller 20 can thus be configured to perform or facilitate any or all of the operations 252, 254, 256, 258, 260 of the method 250 described above by operating one or more of the drive mechanisms 52, 110, 120, 136, 140, 162, 172, 210 accordingly. In particular, the controller 20 can be configured to facilitate the method 250 by automatically performing the operations 254, 256, 258, 260 in the sequence(s) described above.

In some examples, the control system 18 can include a user interface 230 (e.g., button(s), switch(es), touchscreen, keyboard, mouse, touchpad, etc.) that permits a user to interact with the control system 18. In particular, the user interface 230 can permit a user to selectively operate any one or more of the drive mechanisms 52, 110, 120, 136, 140, 162, 172, 210 with the controller 20. Moreover, the user interface 230 can permit a user to selectively perform any one or more of the operations 252, 254, 256, 258, 260 in the method 250 with the controller 20. Still further, the user interface 230 can permit a user to program (e.g., input, adjust, etc.) any one or more of the predetermined states described above in the controller 20.

The apparatus 10 has been described above as comprising various linear actuators. In particular, certain drive mechanisms have been described as corresponding to a linear actuator. It is to be appreciated that each linear actuator in the present disclosure can be, for example, a mechanical actuator, a hydraulic actuator, a pneumatic actuator, an electro-mechanical actuator, or some other type of actuator having two members that are movable relative to each other in a linear manner. Moreover, the drive mechanisms disclosed herein may comprise other means that are operable to drive their respective features. The linear actuators described herein are merely exemplary and not intended to limit the scope of the invention.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. An apparatus for cutting a plurality of workpieces collectively into a plurality of blocks, the apparatus being arranged relative to a first reference axis, a second reference axis, and a third reference axis that are perpendicular to each other, the apparatus comprising:
    a cutting assembly configured to cut the plurality of workpieces collectively, the cutting assembly comprising:
        a chassis,
        a first saw blade movably coupled to the chassis and configured to cut along a first cutting plane, and
        a second saw blade movably coupled to the chassis and configured to cut along a second cutting plane that is transverse to the first cutting plane; and
    an input assembly configured to support and clamp the plurality of workpieces collectively while being cut by the cutting assembly, the input assembly comprising:
        a tabletop for supporting the plurality of workpieces collectively, a first clamping mechanism for clamping the plurality of workpieces collectively, the first clamping mechanism comprising:
  a first movable member movably coupled to the tabletop such that the first movable member is translatable along the first reference axis, and
  a first counterpart coupled to the tabletop such that the first movable member is translatable relative to the first counterpart in order to clamp the plurality of workpieces between the first counterpart and the first movable member, and
a second clamping mechanism for clamping the plurality of workpieces collectively, the second clamping mechanism comprising:
  a plurality of second movable members movably coupled to the tabletop such that each second movable member is translatable along the second reference axis, and
  a second counterpart coupled to the tabletop such that each second movable member is translatable relative to the second counterpart in order to clamp an associated workpiece between the second counterpart and the plurality of second movable members.

2. The apparatus according to claim 1, wherein the second reference axis is vertical and the first reference axis is substantially horizontal.

3. The apparatus according to claim 1, wherein the first cutting plane is substantially horizontal and the second cutting plane is substantially vertical.

4. The apparatus according to claim 1, wherein the first movable member comprises at least one elongated body, each elongated body having a longitudinal axis that is substantially perpendicular to the first reference axis.

5. The apparatus according to claim 4, wherein:
the first movable member comprises two elongated bodies that are fixed relative to each other via a linkage, and
the first movable member is rotatable about a first rotational axis that is substantially perpendicular to the first reference axis.

6. The apparatus according to claim 5, wherein the first movable member is rotatably coupled to an arm that is rotatable about a second rotational axis, the second rotational axis being substantially parallel to and spaced from the first rotational axis.

7. The apparatus according to claim 1, wherein the first counterpart comprises an elongated body that is fixed to the tabletop, the elongated body having a longitudinal axis that is substantially perpendicular to the first reference axis.

8. The apparatus according to claim 7, wherein the first counterpart comprises one or more bearings rotatably coupled to its elongated body such that each bearing is rotatable about the longitudinal axis of the elongated body.

9. The apparatus according to claim 1, wherein each second movable member is translatable along the third reference axis.

10. The apparatus according to claim 1, wherein the second clamping mechanism comprises an actuator assembly comprising:
  a pin plate defining a plurality of pin holes;
  a plurality of retainment plates; and
  a plurality of linear actuators, each linear actuator comprising a main body fixed to an associated retainment plate and a rod fixed to the pin plate that is movable relative to the main body,
  wherein each second movable member is fixed to one of the retainment plates and extends through one of the pin holes.

11. The apparatus according to claim 1, wherein:
the first saw blade is movably coupled to the chassis such that the first saw blade is translatable along the first reference axis, and
the second saw blade is movably coupled to the chassis such that the second saw blade is translatable along the second reference axis.

12. The apparatus according to claim 1, further comprising:
  a first drive mechanism that is operable to translate the first movable member along the first reference axis between a first engaged state and a first released state,
  a second drive mechanism that is operable to translate the plurality of second movable members along the second reference axis between a second engaged state and a second released state,
  a third drive mechanism that is operable to translate the plurality of second movable members along the third reference axis between an advanced state and a retracted state,
  a fourth drive mechanism that is operable to impart a first cutting motion to the first saw blade,
  a fifth drive mechanism that is operable to impart a second cutting motion to the second saw blade,
  a sixth drive mechanism that is operable to translate the first saw blade along the first reference axis, and
  a seventh drive mechanism that is operable to translate the second saw blade along the second reference axis.

13. The apparatus according to claim 12, further comprising a control system having a controller that is configured to perform a clamping operation, wherein during the clamping operation:
the controller operates the first drive mechanism to translate the first movable member along the first reference axis from the first released state to the first engaged state, and
the controller operates the second drive mechanism to translate the plurality of second movable members along the second reference axis from the second released state to the second engaged state.

14. The apparatus according to claim 13, wherein the controller is configured to perform a cutting operation, wherein during the cutting operation:
the controller operates the fourth drive mechanism to impart the first cutting motion to the first saw blade,
the controller operates the fifth drive mechanism to impart the second cutting motion to the second saw blade,
the controller operates the sixth drive mechanism to translate the first saw blade along the first reference axis, and
the controller operates the seventh drive mechanism to translate the second saw blade along the second reference axis.

15. The apparatus according to claim 13, wherein the controller is configured to perform a releasing operation, wherein during the releasing operation:
the controller operates the first drive mechanism to translate the first movable member along the first reference axis from the first engaged state to the first released state, and
the controller operates the second drive mechanism to translate the plurality of second movable members along the second reference axis from the second engaged state to the second released state.

16. The apparatus according to claim 15, wherein the controller is configured to perform an advancing operation, wherein during the advancing operation:
   the controller operates the third drive mechanism to translate the plurality of second movable members along the third reference axis from the advanced state to the retracted state, and then
   the controller operates the second drive mechanism to translate the plurality of second movable members along the second reference axis from the second released state to the second engaged state, and then
   the controller operates the third drive mechanism to translate the plurality of second movable members along the third reference axis from the retracted state to the advanced state.

17. The apparatus according to claim 15, wherein each workpiece corresponds to a wooden board.

18. An input assembly for supporting and clamping a plurality of workpieces collectively during a cutting operation, the input assembly being arranged relative to a first reference axis, a second reference axis, and a third reference axis that are perpendicular to each other, the input assembly comprising:
   a tabletop for supporting the plurality of workpieces collectively;
   a first clamping mechanism for clamping the plurality of workpieces collectively, the first clamping mechanism comprising:
      a first movable member movably coupled to the tabletop such that the first movable member is translatable along the first reference axis, and
      a first counterpart coupled to the tabletop such that the first movable member is translatable relative to the first counterpart in order to clamp the plurality of workpieces between the first counterpart and the first movable member; and
   a second clamping mechanism for clamping the plurality of workpieces collectively, the second clamping mechanism comprising:
   a plurality of second movable members movably coupled to the tabletop such that each second movable member is translatable along the second reference axis, and
   a second counterpart coupled to the tabletop such that each second movable member is translatable relative to the second counterpart in order to clamp an associated workpiece between the second counterpart and the plurality of second movable members.

19. The input assembly according to claim 18, wherein:
   the first movable member comprises two elongated bodies that are fixed relative to each other via a linkage, each elongated body having a longitudinal axis that is substantially perpendicular to the first reference axis, and
   the first movable member is rotatable about a first rotational axis that is substantially perpendicular to the first reference axis.

20. The input assembly according to claim 18, wherein the second clamping mechanism comprises an actuator assembly comprising:
   a pin plate defining a plurality of pin holes;
   a plurality of retainment plates; and
   a plurality of linear actuators, each linear actuator comprising a main body fixed to an associated retainment plate and a rod fixed to the pin plate that is movable relative to the main body,
   wherein each second movable member is fixed to one of the retainment plates and extends through one of the pin holes.

* * * * *